(12) United States Patent
Yada et al.

(10) Patent No.: US 9,505,459 B2
(45) Date of Patent: Nov. 29, 2016

(54) INVERTED PENDULUM TYPE VEHICLE

(71) Applicant: HONDA MOTOR CO., LTD., Tokyo (JP)

(72) Inventors: Wataru Yada, Wako (JP); Hiroshi Iwakami, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 26 days.

(21) Appl. No.: 14/246,846

(22) Filed: Apr. 7, 2014

(65) Prior Publication Data

US 2014/0353051 A1    Dec. 4, 2014

(30) Foreign Application Priority Data

May 31, 2013 (JP) ................. 2013-115732

(51) Int. Cl.
*B62K 1/00* (2006.01)
*B62K 3/00* (2006.01)

(52) U.S. Cl.
CPC ........ *B62K 3/007* (2013.01); *B62K 1/00* (2013.01)

(58) Field of Classification Search
CPC ......... B62K 1/00; B62K 3/007; B62D 61/00
USPC ...... 180/6.2, 7.1, 15, 21, 209; 280/301, 303, 280/755
See application file for complete search history.

(56) References Cited

U.S. PATENT DOCUMENTS 1,915,886 A * 6/1933 Gutierrez ............. B60K 7/0007
180/10

| 3,895,818 A * | 7/1975 | Fearon ................ B60G 17/052 180/24.02 |
| 5,385,210 A | 1/1995 | Harvey |
| 5,791,425 A | 8/1998 | Kamen et al. |
| 6,247,712 B1 * | 6/2001 | Smith .................... B62D 61/12 180/209 |

(Continued)

FOREIGN PATENT DOCUMENTS

| DE | 20 2007 007 673 U1 | 10/2007 |
| EP | 1 529 556 A2 | 5/2005 |

(Continued)

OTHER PUBLICATIONS

U.S. Office Action for U.S. Appl. No. 14/223,360, dated Sep. 3, 2015.

(Continued)

*Primary Examiner* — Anne Marie Boehler
(74) *Attorney, Agent, or Firm* — Birch, Stewart, Kolasch & Birch, LLP

(57) ABSTRACT

In an inverted pendulum type vehicle no excessive load is exerted on a sub-wheel even in the case where some downward load is exerted on a sub-wheel arm. The inverted pendulum type vehicle includes a main wheel capable of moving forward, rearward, to the left and to the right with a vehicle body frame supported by the main wheel. The inverted pendulum type vehicle further includes the sub-wheel arm turnably supported on the vehicle body frame with the sub-wheel being supported by the sub-wheel arm and being grounded. The sub-wheel is supported through a deformable biasing device, and is biased into a predetermined position in relation to the sub-wheel arm. When a downward load is exerted on the sub-wheel arm, the biasing device deforms, whereby at least part of the sub-wheel arm is grounded.

10 Claims, 12 Drawing Sheets

(56) References Cited

U.S. PATENT DOCUMENTS

| | | | |
|---|---|---|---|
| 6,302,230 B1 | 10/2001 | Kamen et al. | |
| 6,827,163 B2 | 12/2004 | Amsbury et al. | |
| 6,840,346 B2 | 1/2005 | Sugitani et al. | |
| 7,690,452 B2 | 4/2010 | Kamen et al. | |
| 7,740,099 B2 | 6/2010 | Field et al. | |
| 7,963,352 B2 | 6/2011 | Alexander | |
| 8,050,837 B2 | 11/2011 | Yamada | |
| 8,235,419 B1* | 8/2012 | Giarrusso | B62H 1/12 280/296 |
| 8,353,378 B2 | 1/2013 | Gomi et al. | |
| 8,408,339 B2 | 4/2013 | Makino | |
| 8,467,922 B2 | 6/2013 | Takenaka | |
| 8,467,948 B2 | 6/2013 | Takenaka et al. | |
| 8,522,902 B2 | 9/2013 | Gomi et al. | |
| 8,583,302 B2 | 11/2013 | Akimoto et al. | |
| 8,751,110 B2 | 6/2014 | Takenaka et al. | |
| 8,758,191 B2 | 6/2014 | Takenaka et al. | |
| 9,037,331 B2 | 5/2015 | Taira et al. | |
| 9,085,334 B2 | 7/2015 | Hoffman et al. | |
| 2001/0032743 A1 | 10/2001 | Kamen et al. | |
| 2002/0023787 A1 | 2/2002 | Kamen et al. | |
| 2004/0069543 A1 | 4/2004 | Kamen et al. | |
| 2004/0201271 A1* | 10/2004 | Kakinuma | B62H 1/12 303/113.1 |
| 2005/0121238 A1 | 6/2005 | Ishii | |
| 2005/0121866 A1 | 6/2005 | Kamen et al. | |
| 2005/0126833 A1 | 6/2005 | Takenaka et al. | |
| 2007/0084662 A1 | 4/2007 | Oikawa | |
| 2007/0158117 A1 | 7/2007 | Alexander | |
| 2007/0251735 A1 | 11/2007 | Kakinuma et al. | |
| 2007/0296170 A1 | 12/2007 | Field et al. | |
| 2008/0161990 A1 | 7/2008 | Gansler | |
| 2008/0245594 A1 | 10/2008 | Ishii et al. | |
| 2008/0271938 A1 | 11/2008 | Gulak | |
| 2009/0055033 A1 | 2/2009 | Gansler et al. | |
| 2009/0105908 A1 | 4/2009 | Casey et al. | |
| 2009/0288900 A1 | 11/2009 | Takenaka et al. | |
| 2010/0017069 A1 | 1/2010 | Miki et al. | |
| 2010/0030440 A1 | 2/2010 | Kosaka | |
| 2010/0030441 A1 | 2/2010 | Kosaka | |
| 2010/0030442 A1 | 2/2010 | Kosaka | |
| 2010/0038960 A1 | 2/2010 | Takenaka et al. | |
| 2010/0070132 A1 | 3/2010 | Doi | |
| 2010/0071984 A1 | 3/2010 | Doi et al. | |
| 2010/0096905 A1 | 4/2010 | Takenaka et al. | |
| 2010/0114420 A1 | 5/2010 | Doi | |
| 2010/0114421 A1 | 5/2010 | Doi | |
| 2010/0114468 A1 | 5/2010 | Field et al. | |
| 2010/0152987 A1 | 6/2010 | Gorai | |
| 2010/0168993 A1 | 7/2010 | Doi et al. | |
| 2010/0235028 A1 | 9/2010 | Ishii | |
| 2010/0299044 A1 | 11/2010 | Miyake et al. | |
| 2011/0006498 A1 | 1/2011 | Mercier | |
| 2011/0010066 A1 | 1/2011 | Fuwa | |
| 2011/0035101 A1 | 2/2011 | Kawada et al. | |
| 2011/0060518 A1 | 3/2011 | Kosaka | |
| 2011/0067936 A1 | 3/2011 | Takenaka et al. | |
| 2011/0070998 A1 | 3/2011 | Takenaka et al. | |
| 2011/0071714 A1 | 3/2011 | Takenaka | |
| 2011/0071715 A1 | 3/2011 | Akimoto et al. | |
| 2011/0071752 A1 | 3/2011 | Takenaka et al. | |
| 2011/0098884 A1 | 4/2011 | Doi | |
| 2011/0118968 A1 | 5/2011 | Takenaka et al. | |
| 2011/0130925 A1 | 6/2011 | Oikawa | |
| 2011/0166713 A1 | 7/2011 | Tsuji et al. | |
| 2011/0209929 A1 | 9/2011 | Heinzmann et al. | |
| 2011/0209932 A1 | 9/2011 | Takenaka et al. | |
| 2011/0213522 A1 | 9/2011 | Stevens et al. | |
| 2011/0233989 A1 | 9/2011 | Takenaka et al. | |
| 2011/0264350 A1 | 10/2011 | Doi | |
| 2012/0046856 A1 | 2/2012 | Doi | |
| 2012/0123647 A1 | 5/2012 | Doi et al. | |
| 2012/0173041 A1 | 7/2012 | Takenaka et al. | |
| 2012/0173042 A1 | 7/2012 | Takenaka et al. | |
| 2012/0173086 A1 | 7/2012 | Takenaka et al. | |
| 2012/0217072 A1 | 8/2012 | Hoffmann et al. | |
| 2012/0232757 A1 | 9/2012 | Oikawa | |
| 2013/0133959 A1 | 5/2013 | Kamiyama et al. | |
| 2013/0299254 A1 | 11/2013 | Mutoh et al. | |
| 2013/0299263 A1 | 11/2013 | Shimizu et al. | |
| 2014/0188338 A1 | 7/2014 | Ito et al. | |
| 2014/0236426 A1 | 8/2014 | Kosaka et al. | |
| 2014/0330507 A1 | 11/2014 | Oikawa | |

FOREIGN PATENT DOCUMENTS

| | | |
|---|---|---|
| EP | 1 632 428 A1 | 3/2006 |
| EP | 2 045 180 A1 | 4/2009 |
| EP | 2 052 924 A1 | 4/2009 |
| EP | 2 163 467 A1 | 3/2010 |
| EP | 2 319 750 A1 | 5/2011 |
| GB | 2242173 A | 9/1991 |
| JP | 2004/129435 A | 4/2004 |
| JP | 4181113 B2 | 11/2008 |
| JP | 2010-167807 A | 8/2010 |
| JP | 2010-167808 A | 8/2010 |
| JP | 2011-57111 A | 3/2011 |
| JP | 2011/063183 A | 3/2011 |
| JP | 2011-63183 A | 3/2011 |
| JP | 2011-63241 A | 3/2011 |
| JP | 2011-63243 A | 3/2011 |
| JP | 2011-68222 A | 4/2011 |
| TW | M424290 U1 | 3/2012 |
| WO | WO 02/30730 A2 | 4/2002 |
| WO | WO 2008/132778 A1 | 11/2008 |
| WO | WO 2008/132779 A1 | 11/2008 |
| WO | WO 2010/113439 A1 | 10/2010 |
| WO | WO 2011/033575 A1 | 3/2011 |
| WO | WO 2012/017335 A1 | 2/2012 |

OTHER PUBLICATIONS

Al-Hadithi et al., "Fuzzy Optimal Control for Double Inverted Pendulum", 7th IEEE Conference on Industrial Electronics and Applications (ICIEA), 2012, pp. 1-5.

Chen, "Analysis and Design of Robust Feedback Control Systems for a Nonlinear Two-Wheel Inverted Pendulum System", 2012 International Symposium on Computer, Consumer and Control, IEEE, 2012, 1 page (abstract only).

Ghorbani et al., "Fault tolerant improvement with chaos synchronization using Fuzzy-PID control", 13th Iranian Conference on Fuzzy Systems (IFSC), IEEE, 2013, 5 pages.

Jiang et al., "High Gain Disturbance Observer and its Application in Robust Control Attenuation", Proceeding of the IEEE International Conference on Information and Automation, IEEE, Aug. 2013, pp. 230-235.

Lee et al., "Application of Dynamic Inversion with Extended High-Gain Observers to Inverted Pendulum on a Cart", 2013 American Control Conference (ACC), Jun. 17-19, 2013, AACC, 4234-4238.

Phaoharuhansa et al., "Trajectory Tracking for Wheeled Inverted Pendulum Robot using Tilt Angle Control", IEEE, 2013, pp. 4288-4293.

Yang et al., "Neural Network-Based Motion Control of Underactuated Wheeled Inverted Pendulum Models", IEEE Transactions on Neural Networks and Learning Systems, vol. 25, No. 11, Nov. 2014, pp. 2004-2016.

Zhang et al., "Variable Gain Linear Quadratic Regulator and its Application", Proceedings of 2014 IEEE International Conference on Mechatronics and Automation, Aug. 3-6, 2014, pp. 1745-1750.

U.S. Notice of Allowance dated Apr. 4, 2016 mailed in co-pending U.S. Appl. No. 14/225,471.

U.S. Office Action for U.S. Appl. No. 14/225,471, dated Oct. 1, 2015.

U.S. Office Action for U.S. Appl. No. 14/225,777, dated Oct. 5, 2015.

Notice of Allowance dated Feb. 25, 2015 issued in co-pending U.S. Appl. No. 14/273,075.

(56) References Cited

OTHER PUBLICATIONS

Office Action dated Feb. 24, 2015 issued in co-pending U.S. Appl. No. 14/223,360.
U.S. Notice of Allowance, dated Feb. 2, 2016, for U.S. Appl. No. 14/225,777.
U.S. Office Action, dated Jan. 25, 2016, for U.S. Appl. No. 14/244,279.
U.S. Office Action, dated Oct. 7, 2015, for U.S. Appl. No. 14/225,489.
Extended European Search Report for Application 14169797.9 dated Oct. 7, 2014.
Extended European Search Report for Application 14169800.1 dated Oct. 7, 2014.

* cited by examiner

INVERTED PENDULUM TYPE VEHICLE

CROSS-REFERENCE TO RELATED APPLICATIONS

The present application claims priority under 35 USC 119 to Japanese Patent Application No. 2013-115732 filed May 31, 2013 the entire contents of which are hereby incorporated by reference.

BACKGROUND OF THE INVENTION

1. Field of the Invention

The present invention relates to an inverted pendulum type vehicle. More particularly, to an inverted pendulum type vehicle provided with a sub-wheel for facilitating turning (turning-round) in addition to a main wheel.

2. Description of Background Art

An inverted pendulum type vehicle is known wherein the inverted pendulum type vehicle includes a vehicle body frame, a main wheel having a plurality of rotatable driven rollers combined so that axes of rotation of the driven rollers are in an annular form with left and right driving disks rotatably supported on the vehicle body frame so as to be located respectively on both sides of the main wheel and substantially coaxially with the axis of rotation of the main wheel. Each of the driving disks is provided with a plurality of rotatable driving rollers disposed so as to make contact with the driven rollers in a twisted relationship. Driving means is provided for individually driving the left and right driving disks. See, for example, Japanese Patent Laid-Open No. 2011-63243.

The inverted pendulum type vehicle according to Japanese Patent Laid-Open No. 2011-63243 can move forward and rearward by rotating the left and right driving disks and rotating the main wheel around an axis that extends in the left-right direction. In addition, the inverted pendulum type vehicle can move leftward and rightward by rotating the left and right driving disks with a speed difference therebetween and rotating the driven rollers. In this way, the inverted pendulum type vehicle can travel in any of a forward, rearward, leftward and rightward directions.

The inverted pendulum type vehicle according to Japanese Patent Laid-Open No. 2011-63243, however, has a difficult problem with respect to a leftward and a rightward turning (turning-round), through it is good at forward, rearward, leftward and rightward movements. One of considerable solutions to this problem is to provide a sub-wheel in addition to the main wheel and to turn (turn round) the inverted pendulum type vehicle by utilizing a frictional force generated between the sub-wheel and a floor surface or a driving force generated by the sub-wheel. In regard to such an inverted pendulum type vehicle, a configuration can be contemplated in which the sub-wheel is supported by a sub-wheel arm provided to be turnable in the vertical direction relative to the vehicle body frame with the sub-wheel being grounded under its own weight. However, when it is assumed that some external force for pressing the sub-wheel arm down is exerted on the sub-wheel arm, the sub-wheel is enlarged more than necessary, for the purpose of securing a load resistance of a rotary shaft of the sub-wheel or a support structure for the rotary shaft.

SUMMARY AND OBJECTS OF THE INVENTION

The present invention has been made in consideration of the above-mentioned background. Accordingly, it is an object of an embodiment of the present invention to ensure, in regard of an inverted pendulum type vehicle, that exertion of an excessive load on a sub-wheel is avoided even in the case where some pressing-down external force is exerted on a sub-wheel arm.

In order to solve the above-mentioned problem, according to an embodiment of the present invention, there is provided an inverted pendulum type vehicle (1) having a main wheel (3) capable of moving forward, rearward, leftward and rightward, and a vehicle body frame (2) supported by the main wheel, the inverted pendulum type vehicle (1) including:

a sub-wheel arm (101) vertically turnably supported on the vehicle body frame (2); and a sub-wheel (5) supported by the sub-wheel arm and grounded, wherein the sub-wheel is supported through a deformable biasing device (129), the sub-wheel being biased into a predetermined position in relation to the sub-wheel arm, and the biasing device deforms to ground at least part of the sub-wheel arm when a downward load is exerted on the sub-wheel arm.

According to an embodiment of the present invention, the sub-wheel arm supporting the sub-wheel has the deformable biasing device. Therefore, when some pressing-down external force is exerted on the sub-wheel arm, the biasing device deforms and the sub-wheel arm abuts on the floor surface. This ensures that the load pressing the sub-wheel arm down to the floor surface side is prevented from acting on the sub-wheel or on a joint portion between the sub-wheel and the sub-wheel arm. As a result, it is possible to minimize load resistances required of the sub-wheel and the sub-wheel arm, and to make the sub-wheel and the surroundings thereof light in weight and compact.

According to an embodiment of the present invention, preferably, the sub-wheel arm includes at least one bendable rotary joint portion (102), and the biasing device biases the rotary joint portion into a predetermined angle.

According to an embodiment of the present invention, a deformed portion and a direction of deformation of the sub-wheel arm are determined, and a support structure for supporting the sub-wheel by the sub-wheel arm is stabilized.

According to an embodiment of the present invention, preferably, the endmost portion (R) of the sub-wheel that is horizontally spaced most from the main wheel is disposed above the rotary joint portion in a vertical direction.

According to an embodiment of the present invention, the sub-wheel side of the sub-wheel arm can smoothly be turned upward in the case where an obstacle collides on the sub-wheel from the endmost portion side during traveling of the inverted pendulum type vehicle. In such a case, therefore, the sub-wheel can smoothly come over the obstacle by moving upward.

According to an embodiment of the present invention, preferably, the rotary joint portion is located below a line segment (L1) interconnecting a turning shaft (111) for turning of the sub-wheel arm in relation to the vehicle body frame and the endmost portion.

According to an embodiment of the present invention, the direction of a downward load exerted on the sub-wheel arm and the direction of protrusion of the rotary joint portion of the sub-wheel arm in relation to both end portions of the sub-wheel arm coincide with each other. Therefore, the rotary joint portion can easily bend smoothly when the vehicle body frame presses the sub-wheel arm. In addition, when a downward load is exerted on the sub-wheel arm, the sub-wheel arm can be brought into contact with the floor surface at a comparatively early stage. Further, when an obstacle on the floor surface comes into contact with the sub-wheel during traveling of the inverted pendulum type vehicle, the rotary joint portion bends so that the sub-wheel is permitted to easily come over the obstacle.

According to an embodiment of the present invention, preferably, the sub-wheel arm includes a first sub-wheel arm (103) turnably supported on the vehicle body frame, and a second sub-wheel arm (104) supported on the first sub-wheel arm so as to be turnable within a predetermined turning range, and the biasing device is a spring (129) provided between the first sub-wheel arm and the second sub-wheel arm, the spring (129) biasing an end portion of the second sub-wheel arm on a sub-wheel side toward a floor surface side in relation to an end portion of the second sub-wheel arm on the first sub-wheel arm side.

According to an embodiment of the present invention, the sub-wheel arm is formed in a simple structure. In addition, the sub-wheel arm is maintained in a position separate from the floor surface at normal time when no load is exerted thereon. Further, the sub-wheel arm can ground through bending when a load is exerted thereon.

According to an embodiment of the present invention, preferably, the sub-wheel includes a wheel (151) rotatably supported on the sub-wheel arm, and a plurality of free rollers (153) supported on an outer circumferential portion of the wheel so as to be each rotatable about a tangent to the wheel, and the wheel is driven by an electric motor (133).

According to an embodiment of the present invention, the inverted pendulum type vehicle can be turned (turned round) through rotation of the wheel of the sub-wheel. In addition, since the sub-wheel includes the free rollers, the sub-wheel is prevented from constituting a traveling resistance to the inverted pendulum type vehicle, owing to the rotation of the free rollers even in the case where the wheel does not rotate.

According to an embodiment of the present invention, preferably, the rotary joint portion is disposed under the electric motor.

According to an embodiment of the present invention, contact between the electric motor and the floor surface can be obviated even when the rotary joint portion bends. In addition, where the rotary joint portion is disposed to protrude downward in relation to both ends of the sub-wheel arm, the disposition of the electric motor on the back side (upper side) of the protruding portion of the rotary joint portion permits effective utilization of space.

According to an embodiment of the present invention, preferably, the sub-wheel arm has flexibility and an attachable and detachable skid plate (120) at a portion thereof that is grounded when the vehicle body frame is tilted toward the sub-wheel side.

According to an embodiment of the present invention, the contact of the sub-wheel arm with the floor surface through the skid plate therebetween restrains sliding from occurring between the sub-wheel arm and the floor surface. This ensures that the sub-wheel arm can stably support the vehicle body frame relative to the floor surface. In addition, the contact of the sub-wheel arm with the floor surface via the skid plate therebetween restrains marring of the floor surface. Further, since the skid plate can be attached and detached, it can be replaced when worn.

According to an embodiment of the present invention, it is ensured, in an inverted pendulum type vehicle, that an exertion of an excessive load on a sub-wheel can be avoided even where a downward load is exerted on a sub-wheel arm.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
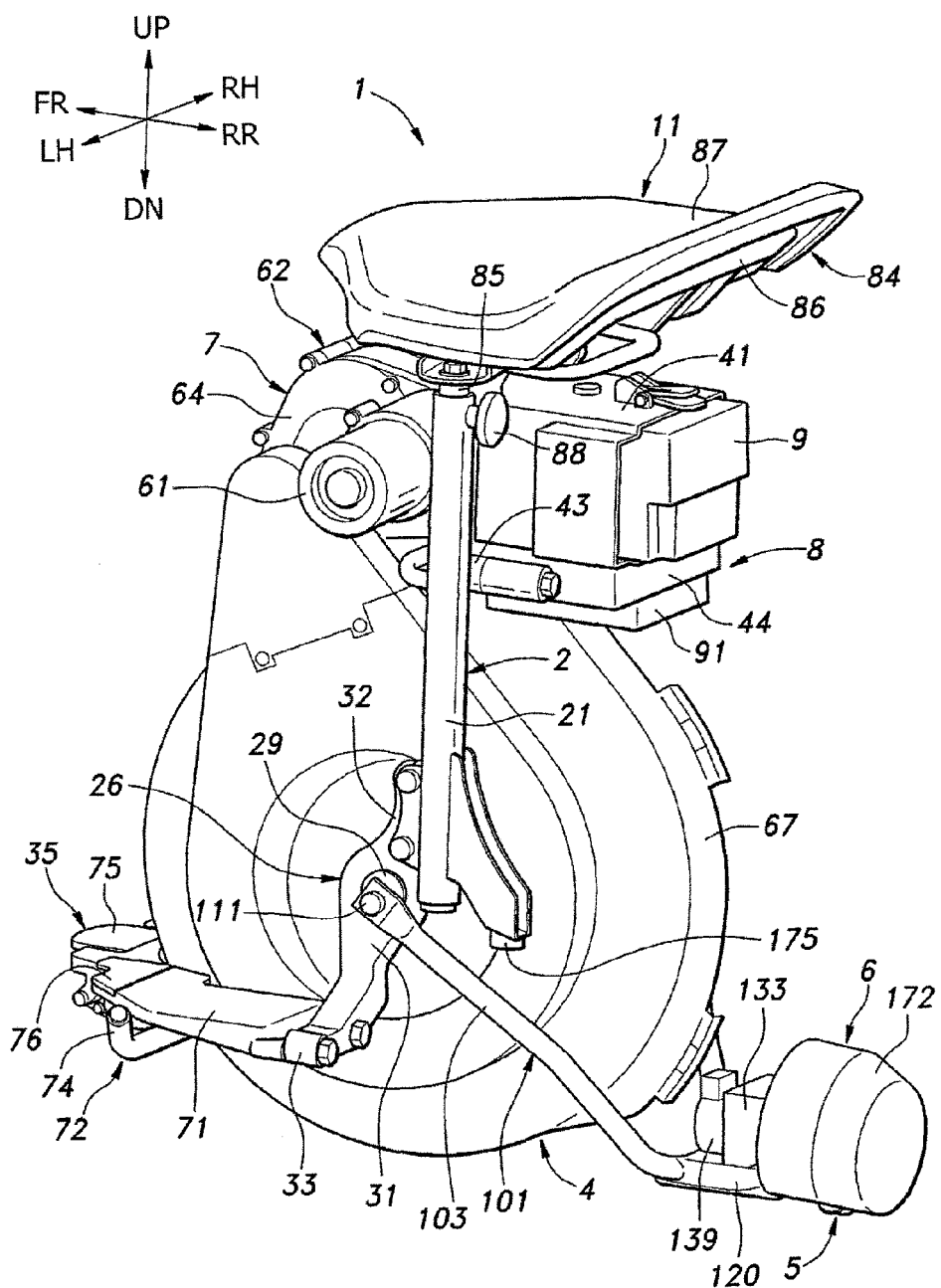
FIG. 1 is a perspective view of an inverted pendulum type vehicle according to an embodiment.

Now, an embodiment of an inverted pendulum type vehicle according to the present invention will be described below referring to the drawings. In the following description, directions (upward (UP), downward (DN), leftward or left-hand (LH), rightward or right-hand (RH), forward or front (FR), rearward or rear (RR)) are specified with reference to the rider (occupant) seated on the inverted pendulum type vehicle.

Figure 2:
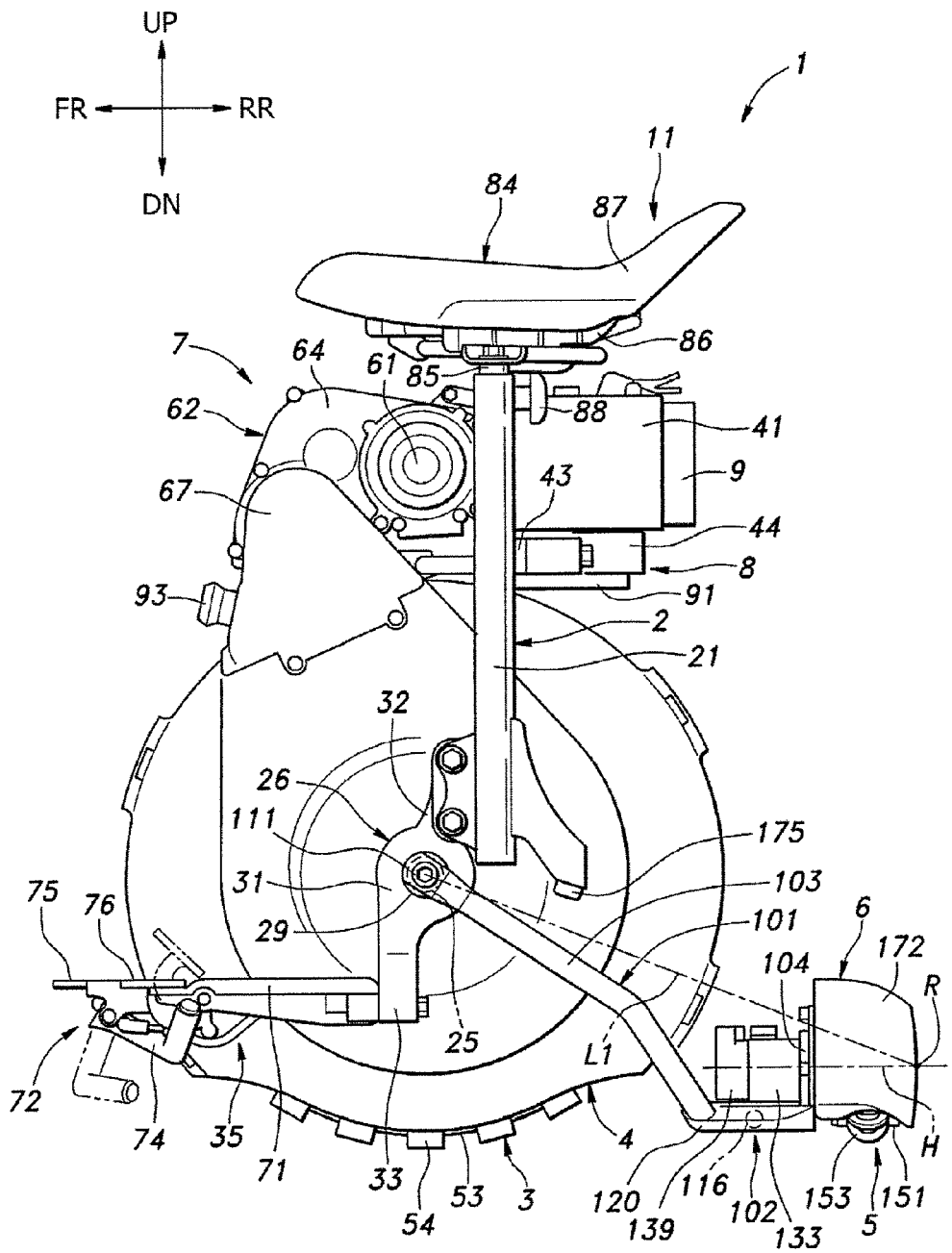
FIG. 2 is a side view of the inverted pendulum type vehicle.
Figure 3:
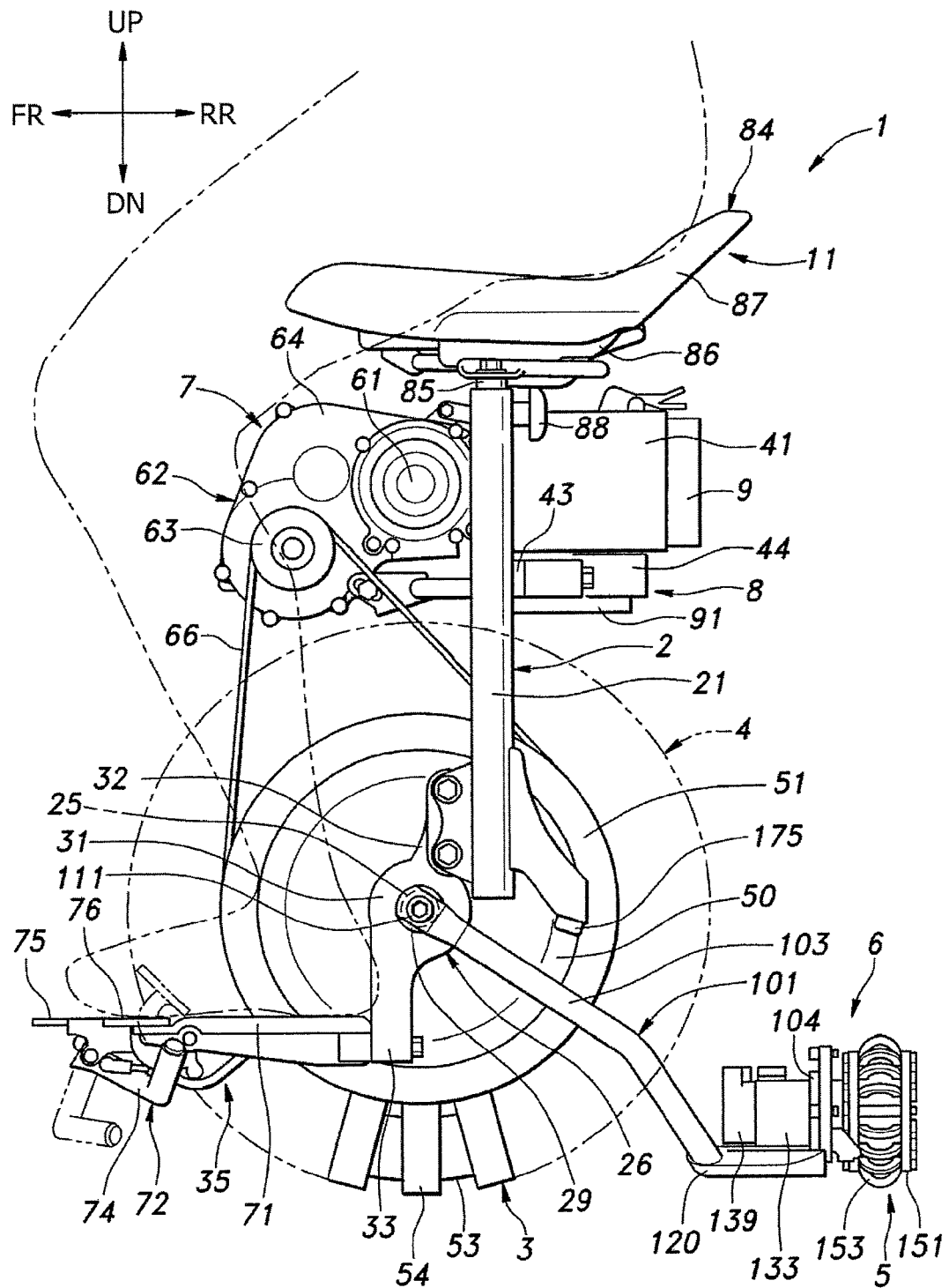
FIG. 3 is a side view of the inverted pendulum type vehicle in a state wherein a wheel cover has been detached.
Figure 4:
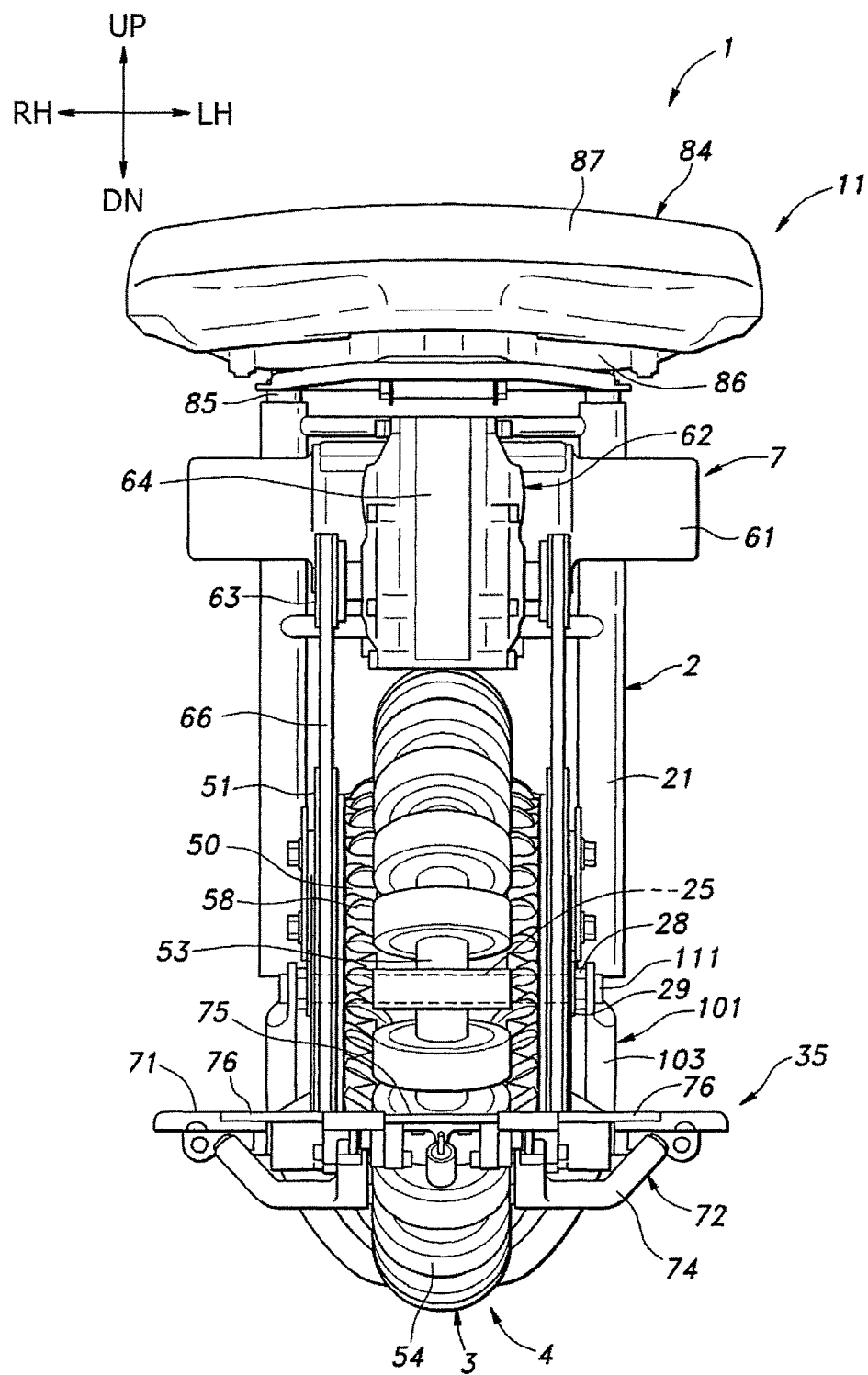
FIG. 4 is a front view of the inverted pendulum type vehicle shown in the state wherein the wheel cover has been detached.

FIG. 1 is a perspective view of an inverted pendulum type vehicle according to an embodiment of the present invention; FIG. 2 is a side view of the inverted pendulum type vehicle; FIG. 3 is a side view of the inverted pendulum type vehicle in a state wherein a wheel cover has been detached; and FIG. 4 is a front view of the inverted pendulum type vehicle shown in a state wherein a step unit is in a stored state and the wheel cover has been detached. As shown in FIGS. 1 to 4, the inverted pendulum type vehicle 1 includes a vehicle body frame 2 constituting a framework of a vehicle body; a main wheel unit 4 including a main wheel 3; a sub-wheel unit 6 including a sub-wheel 5; a driving unit 7 for driving the main wheel unit 4; an electrical unit 8 for controlling the driving unit 7 and the sub-wheel unit 6; a battery pack 9 for supplying the electrical unit 8 with electric power; and a saddle unit 11 on which the rider is seated.

Figure 5:
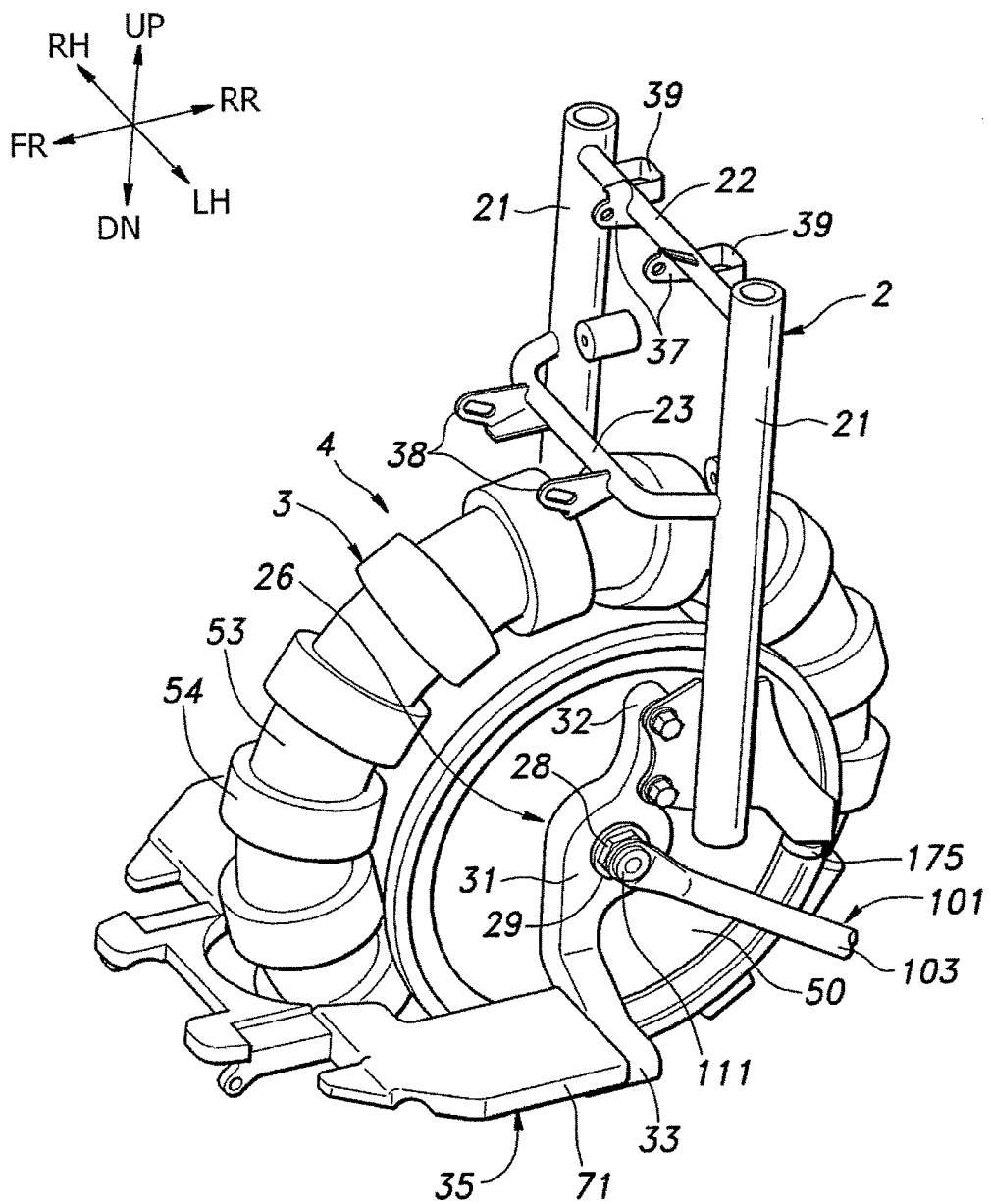
FIG. 5 is a perspective view of a vehicle body frame.

FIG. 5 is a perspective view of a vehicle body frame. As shown in FIGS. 1 to 5, the vehicle body frame 2 includes a pair of left and right side posts 21 extending vertically; and an upper beam 22 and a middle beam 23 that extend in the left-right direction and interconnect the left and right side posts 21. The upper beam 22 extends rectilinearly, and both left and right ends thereof are joined to upper end portions of the left and right side posts 21. The middle beam 23 is disposed below the upper beam 22, and both left and right ends thereof are joined to intermediate portions of the left and right side posts 21. The middle beam 23 is formed in a bent shape such that an intermediate portion in the lengthwise direction thereof protrudes forward as compared with both the left and right ends thereof. The side posts 21, the upper beam 22, and the middle beam 23 are formed from steel pipe material, and are mutually joined by bolting or welding, unless particularly limited. Hereinafter, the term "joining" will include known joining techniques such as bolting and welding. In other embodiments, the side posts 21, the upper beam 22, and the middle beam 23 may be formed from known materials such as pressed steel sheet.

To lower end portions of the left and right side posts 21, mount members (axel support members) 26 supported on an axle 25 supporting the main wheel unit 4 are joined, respectively. The axle 25 and the mount members 26 constitute a part of the vehicle body frame 2. The mount member 26 includes a mount base portion 31 formed therein with an axle hole (not shown); a post joint portion 32 extending upward from the mount base portion 31; and a step joint portion 33 extending downward from the mount base portion 31. The post joint portion 32 is joined to a lower end portion of the side post 21. The left and right axle holes are formed so as to penetrate the mount base portions 31 in the left-right direction, and are disposed coaxially with each other. The inside diameter of the axle holes is set to be smaller than the outside diameter of the axle 25. An axle fastening bolt 28 is inserted and passed through the axle hole (see FIG. 4). A shank portion of the axle fastening bolt 28 penetrates a washer 29 and the axle hole in this order from an outer side in the left-right direction, and is set in screw engagement with an end portion of the axle 25, thereby fastening the axle 25 to the mount members 26 in a non-rotatable manner. The left and right step joint portions 33 extend downwardly from the mount base portions 31, after which they extend in such directions so as to part away from each other in the left-right direction. A step unit 35 which will be described later is arranged in a spanning manner between the lower ends of the left and right step joint portions 33.

A pair of left and right first brackets 37 are joined to the upper beam 22 in a forwardly protruding form. A pair of left and right second brackets 38 are joined to the middle beam 23 in a forwardly protruding form. The driving unit 7 is bolted to the first and second brackets 37 and 38. The driving unit 7 is disposed forwardly of upper portions of the left and right side posts 21.

A pair of left and right third brackets 39 are joined to the upper beam 22 in a rearwardly protruding form. A battery case 41 for supporting the battery pack 9 is joined to the third brackets 39. The battery case 41 is disposed rearwardly of upper portions of the left and right side posts 21. The battery case 41 is formed in a box-like shape opening toward the rear side, and has therein a connector (not shown) for connection with the battery pack 9. The battery pack 9 is inserted into the battery case 41 from the rear side, thereby being supported on the battery case 41 and connected with the connector.

At intermediate portions of the left and right side posts 21 in the vertical direction, electrical unit joint portions 43 are provided as bolt bosses. An electrical equipment case 44 constituting an outer shell of the electrical unit 8 is bolted to the electrical unit joint portions 43. The electrical equipment case 44 is disposed beneath the battery case 41, in other words, rearwardly of upper portions of the side posts 21.

As shown in FIG. 4, the main wheel unit 4 is disposed between the left and right mount members 26 and between the left and right side posts 21. The main wheel unit 4 includes the axle 25 extending horizontally in the vehicle width direction (left-right direction); left and right driving disks 50 supported on an outer circumference of the axle 25 in an independently rotatable manner; the annular main wheel 3 penetrated by the axle 25 and disposed between the left and right driving disks 50; and left and right cogged-belt driven pulleys 51 joined to the left and right driving disks 50. The left and right driving disks 50 and the left and right driven pulleys 51 are all disposed on the same common axis, specifically, the axis of the axle 25. The axle 25 is formed at its outer circumference with a pair of left and right stepped portions (not shown) located at a predetermined interval in the axial direction of the axle 25. The left and right driving disks 50 are each held between a nut (not shown), that is put in screw engagement with the axle 25, and the stepped portion, whereby the positions of the left and right driving disks 50 in the axial direction of the axle 25 are determined.

The main wheel 3 is a driving wheel that is driven based on an inverted pendulum control. The main wheel 3 includes a metallic annular member 53, and a plurality of driven rollers 54 (free rollers) mounted to the outer circumference of the annular member 53. The main wheel 3 is grounded at its driven roller(s) 54. The driven roller 54 includes a cylindrically shaped metallic base portion (reference symbol thereof is omitted) rotatably mounted to the outer circumference of the annular member 53 and a cylindrically shaped rubber outer circumferential portion (reference symbol thereof is omitted) vulcanized and adhered to the outer circumference of the base portion. A plurality of driven rollers 54 are provided along the annular direction (circle circumferential direction) of the annular member 53. Each of the driven rollers 54 can individually turn (rotate) about a tangent to the annular member 53 at the position where it is arranged. In other words, the main wheel 3 is configured by a method in which the plurality of independently rotatable driven rollers 54 are combined with one another so as to form an annular overall configuration. Strictly speaking, the plurality of driven rollers 54 are arranged so as to form a polygonal overall shape whose number of vertexes corresponds to the number of the driven rollers 54, thereby constituting the main wheel 3.

The left and right driving disks 50 are in a circular disk-like shape having an outside diameter smaller than the radius of the annular member 53, and an outer circumferential portion of each thereof is substantially in the shape of a truncated cone. On an outer circumferential portion of the driving disk 50, a plurality of metallic driving rollers 58 are rotatably supported at regular intervals along the circumferential direction. The driving rollers 58 on the left-hand driving disk 50 and the driving rollers 58 on the right-hand driving disk 50 are disposed in left-right symmetry, in such a manner that the center (axis) of rotation of each driving roller 58 and the center (axis) of rotation of the driving disk 50 are in a twisted relationship (skew-lines relationship). As a result, the left and right driving rollers 58 are in left-right symmetry and in an inclined layout resembling tooth traces of helical gears.

The left and right driving disks 50 are arranged so as to hold the main wheel 3 from the left-hand and right-hand sides, and support the main wheel 3 on substantially the same axis (concentrically). This results in that the main wheel 3 is supported between the left and right driving disks 50.

Outer circumferential portions of the driving rollers 58 of the driving disks 50 are in pressure contact with outer circumferential portions of the driven rollers 54 of the main wheel 3. The driving rollers 58 of the left and right driving disks 50 hold the driven rollers 54 therebetween from the left-hand and right-hand sides. This ensures that the main wheel 3 is supported between the left and right driving disks 50 in an axisless manner, and that the main wheel 3 can turn (revolve) about its own center (axis) together with the left and right driving disks 50. In this manner, the left and right driving disks 50, the left and right driven pulleys 51, the axle 25 and the main wheel 3 constitute an assembly as the main wheel unit 4. The main wheel unit 4 is disposed between the left and right mount members 26, and is fastened to the inside of the mount members 26 by the axle fastening bolt 28 that penetrates the washer 29 and the axle hole and is joined to an end portion of the axle 25. A head portion of the axle fastening bolt 28 protrudes outward in the left-right direction, from the mount member 26.

The driving unit 7 includes a pair of left and right electric motors 61; a speed reduction mechanism 62; and a pair of left and right cogged-belt driving pulleys 63. The speed reduction mechanism 62 includes one gear case 64; a gear train (not shown) for the left-hand electric motor 61 that is supported inside the gear case 64; and a gear train (not shown) for the right-hand electric motor 61 that is supported inside the gear case 64. The left and right electric motors 61 are joined to left and right side portions of the gear case 64, in such a manner that their axes of rotation are coaxial with each other, with the gear case 64 interposed therebetween. Respective output shafts (not shown) of the two gear trains in the speed reduction mechanism 62 protrude, in an coaxial manner, from left and right side portions of the gear case 64. The output shafts of the gear trains are disposed in parallel to the axes of rotation of the left and right electric motors 61. The output shaft of the gear train corresponding to the electric motor 61 on the left-hand side protrudes leftward. The output shaft of the gear train corresponding to the electric motor 61 on the right-hand side protrudes rightward. The driven pulleys 63 are joined to the output shafts of the gear trains, respectively.

The gear case 64 is bolted to the first brackets 37 and the second brackets 38, whereby the driving unit 7 is supported on the vehicle body frame 2. In the condition where the driving unit 7 is supported on the vehicle body frame 2, the driving unit 7 is disposed forwardly of upper portions of the left and right side posts 21, and is disposed upwardly of a front portion of the main wheel unit 4. The left and right electric motors 61 are disposed forwardly of the left and right side posts 21, and protrude outward in the left-right direction in relation to the left and right side posts 21, respectively. The left and right driving pulleys 63 are disposed forwardly and downwardly of the left and right electric motors 61, and are disposed upwardly of the left and right driven pulleys 51. Between and around the driving pulleys 63 and the driven pulleys 51 corresponding to each other on the left-hand and right-hand sides, the endless (or loop-formed) cogged belts 66 are arranged. The driving pulleys 63 are smaller than the driven pulleys 51 in diameter and in number of teeth. This ensures that a rotational force of the electric motor 61 on the left-hand side is transmitted to the driving disk 50 on the left-hand side through the left-hand gear train of the speed reduction mechanism 62, the left-hand driving pulley 63, the cogged belt 66, and the left-hand driven pulley 51. Similarly, a rotational force of the electric motor 61 on the right-hand side is transmitted to the driving disk 50 on the right-hand side through the right-hand gear train of the speed reduction mechanism 62, the right-hand driving pulley 63, the cogged-belt 66, and the right-hand driven pulley 51.

A synthetic resin-made wheel cover 67 is provided so as to cover the main wheel 3, the left and right driving disks 50, the left and right driven pulleys 51, the left and right driving pulleys 63, and the cogged belts 66. The wheel cover 67 is provided at its lower portion with an opening, through which a lower portion of the main wheel 3 is exposed to the exterior.

As shown in FIGS. 1 to 4, the step unit 35 includes a footstep 71 for supporting the soles of a rider's feet, and a stand device 72 provided on the footstep 71. The stand device 72 is used for maintaining the inverted pendulum type vehicle 1 in an erect state at non-use time when an inverted pendulum control is not performed. The footstep 71 includes a front end portion extending in the left-right direction on the front side of the wheel cover 67, and a pair of left and right side portions extending rearwardly respectively from the left end and the right end of the front end portion. The footstep 71 is bolted to the step joint portions 33 of the left and right mount members 26 at rear end portions of the side portions.

The stand device 72 includes a pair of left and right stand arms 74 each of which is supported on the footstep 71 so as to be turnable between an erect position and a stored (retracted) position; an erecting lever 75 for turning each of the stand arms 74 from the stored (retracted) position into the erect position; and a pair of left and right storing (retracting) levers 76 for turning each of the stand arms 74 from the erect position into the stored (retracted) position. The erecting lever 75 and the left and right storing (retracting) lever 76 are each turnably supported on the footstep 71, and connected respectively to the pair of left and right stand arms 74 through each link portion (a reference symbol of which is omitted). The rider can turn each of the stand arms 74 between the erect position and the stored (retracted) position by stepping on the erecting lever 75 and the left and right storing (retracting) lever 76. The left and right stand arms 74, in the erect state, make contact with a floor surface S when the vehicle body frame 2 is tilted toward the front side.

As shown in FIGS. 1 to 4, the saddle unit 11 includes a saddle 84 for supporting the rider's buttocks, and saddle posts 85 supporting the saddle 84 on the vehicle body frame 2. The saddle 84 includes a plate-formed base 86 constituting a framework (bottom plate), and a flexible pad 87 mounted to an upper portion of the base 86. The pair of left and right saddle posts 85 are each in the shape of a column extending vertically, and their upper ends are each joined to a lower portion of the base 86. The left and right saddle posts 85 are inserted into upper end openings of the left and right side posts 21, and supported by the side posts 21. Adjusting screws 88 each penetrating the side post 21 in a radial direction are provided, in screw engagement, near the upper ends of the left and right side posts 21. The left and right saddle posts 85 are formed with receiving holes (not shown) each penetrating the saddle post 85 in a diametric direction for receiving the adjusting screw 88 therein. A plurality of receiving holes are formed along the longitudinal direction of each saddle post 85. By selecting the receiving holes in which to insert the adjusting screws 88, the depth of insertion of the saddle posts 85 into the side posts 21 is selected. In other words, the height of the saddle 84 relative to the side posts 21 can be adjusted by such a selection.

The electrical unit 8 includes a main wheel PDU, a sub-wheel PDU, a DC-DC converter, and an I/O interface, which are not shown in the drawings, as well as a gyro sensor 91. The main wheel PDU is a main wheel control power drive unit for controlling the driving unit 7. The sub-wheel PDU is a sub-wheel control power drive unit for controlling the sub-wheel unit 6. The DC-DC converter lowers a DC voltage supplied to from the battery pack 9 to a predetermined DC voltage. The gyro sensor 91 detects a tilting (inclination) angle and an angular velocity of the vehicle body frame 2 in relation to a predetermined axis (e.g., vertical line). The main wheel PDU, the sub-wheel PDU, the DC-DC converter, and the I/O interface are accommodated in the box-formed electrical equipment case 44 (see FIG. 1).

The electrical equipment case 44 is bolted to the electrical unit joint portion 43 provided on the left and right side posts 21, and is disposed below the battery case 41 and above the main wheel unit 4. In a side view, the electrical equipment case 44 is mostly disposed rearwardly of the left and right side posts 21. The gyro sensor 91 is joined to a bottom surface of the electrical equipment case 44, and is disposed between the electrical equipment case 44 and the main wheel unit 4 in the vertical direction. A switch button 93 for turning ON and OFF a power supply for the electrical unit 8 is provided at a front surface of the wheel cover 67, in other words, on a front upper side of the main wheel 3. An output signal from the switch button 93 is inputted to the I/O interface.

Figure 6:
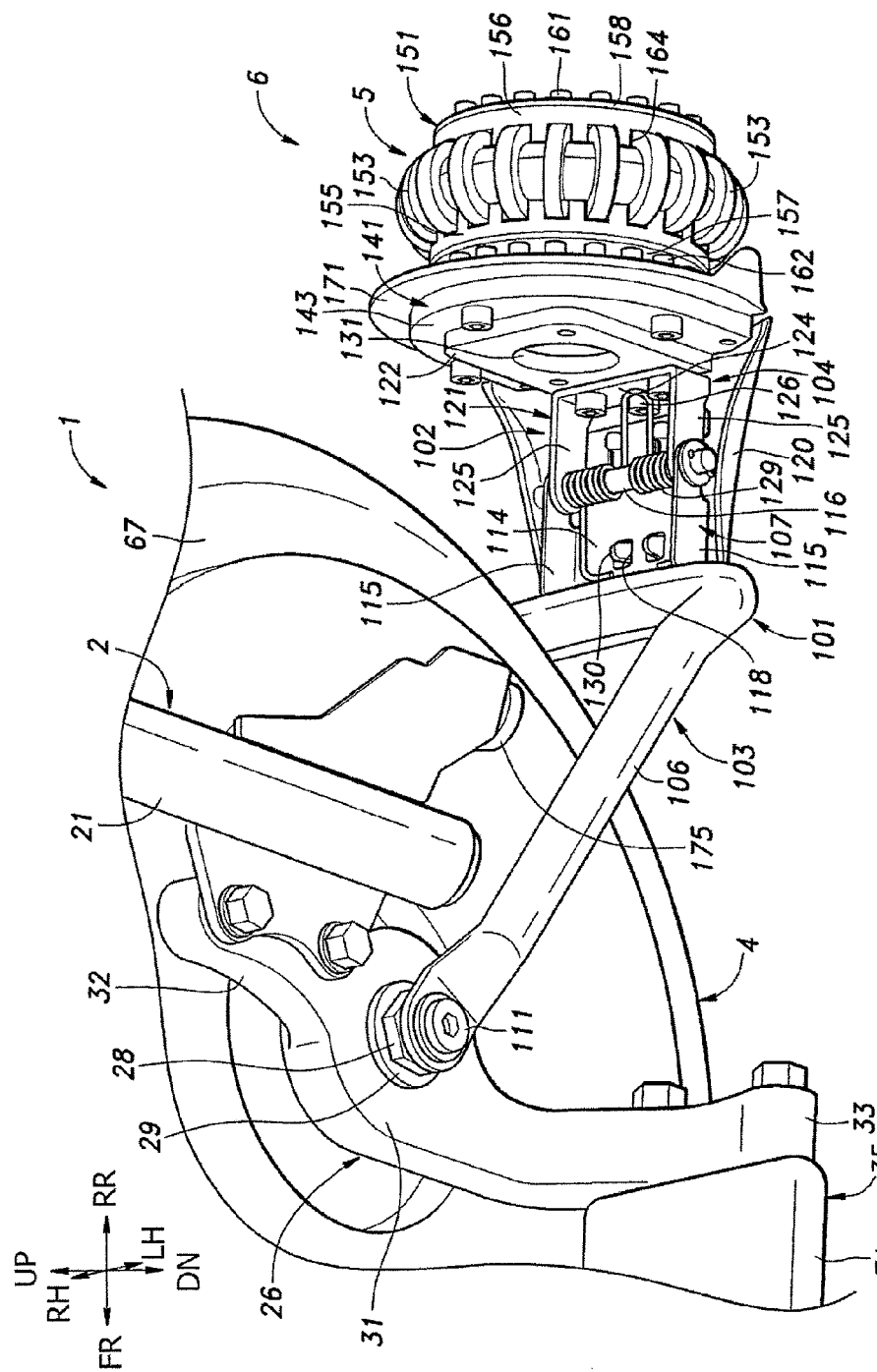
FIG. 6 is a perspective view (showing with an electric motor, a rotational angle sensor and a sub-wheel cover omitted) of a sub-wheel arm and a sub-wheel unit.
Figure 7:
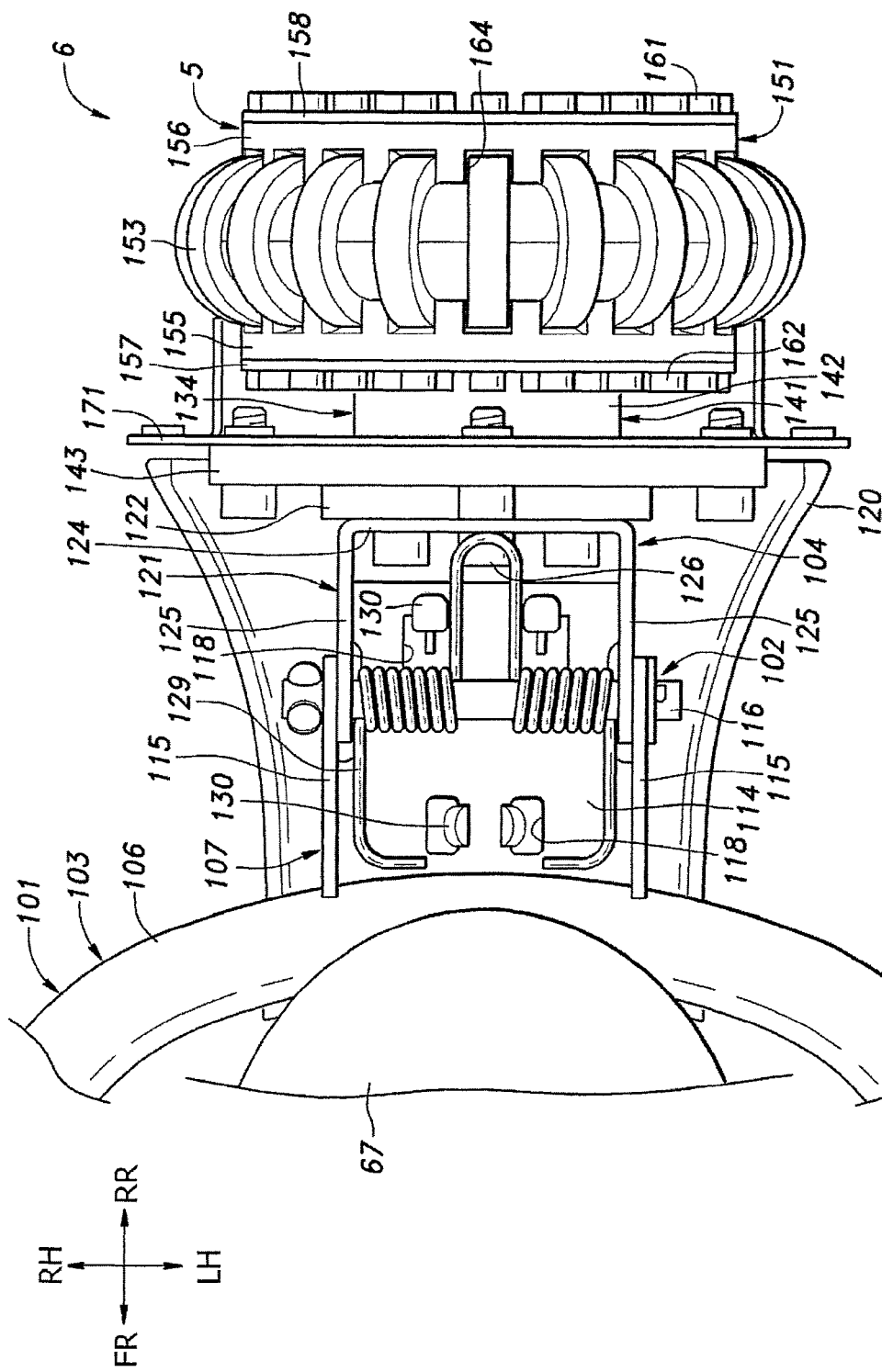
FIG. 7 is a plan view (showing with the electric motor, the rotational angle sensor and the sub-wheel cover omitted) of the sub-wheel arm and the sub-wheel unit.

FIG. 5 is a perspective view of the vehicle body frame; FIG. 6 is a perspective view (showing with an electric motor, the rotational angle sensor and the sub-wheel cover omitted) of the sub-wheel arm and the sub-wheel unit and FIG. 7 is a plan view (showing with the electric motor, the rotational angle sensor and the sub-wheel cover omitted) of the sub-wheel arm and the sub-wheel unit. As shown in FIGS. 5 to 7, the sub-wheel unit 6 is supported on the axle fastening bolt 28 (the axle 25) through a sub-wheel arm 101. The sub-wheel arm 101 includes a first sub-wheel arm 103 and a second sub-wheel arm 104 that are bendably connected to each other through a rotary joint portion 102.

The first sub-wheel arm 103 includes a first sub-wheel arm front portion 106 formed from a metallic pipe material and a first sub-wheel arm rear portion 107 that is a bracket joined to the first sub-wheel arm front portion 106. The first sub-wheel arm front portion 106 is in a U-shaped form opening toward the front side in a plan view. More specifically, of the first sub-wheel arm front portion 106, an intermediate portion in the lengthwise direction extends in the left-right direction, whereas left and right end portions are bent relative to the intermediate portion and extend forward. Left and right front end portions of the first sub-wheel arm front portion 106 are flattened from the left-hand and right-hand sides into a plate-like shape, to form surfaces that face leftward and rightward. Each of the left and right front end portions of the first sub-wheel arm front portion 106 is formed with a bearing hole (not shown) penetrating therethrough in the left-right direction. A turning shaft 111 joined to the head portion of the axle fastening bolt 28 is inserted and passed through each of the bearing holes. The turning shaft 111 is a stepped bolt that includes a shank portion and a stepped head portion. The turning shaft 111 is coaxially set in screw engagement with the head portion of the axle fastening bolt 28. This ensures that the first sub-wheel arm front portion 106 is supported on the axle 25 through the left and right turning shafts 111, in such a manner that it can be turned about an axis passing through the center of the axle 25. As a result, the main wheel unit 4 (the left and right driving disks 50 and the main wheel 3), the wheel cover 67, and the left and right mount members 26 are disposed between the left and right front end portions of the first sub-wheel arm front portion 106. To be more specific, the first sub-wheel arm front portion 106 is supported on the head portions of the turning shafts 111. The first sub-wheel arm front portion 106 is locked onto the stepped portions formed at the head portions of the turning shafts 111, and is supported so that it may not be displaced in the axial direction relative to the turning shafts 111. In other words, the first sub-wheel arm front portion 106 is supported so that it would not come off from the head portions of the turning shafts 111.

The first sub-wheel arm rear portion 107 includes a plate-shaped bottom portion 114, and left and right side wall portions 115 extending upwardly from left and right side edges of the bottom portion 114. The first sub-wheel arm rear portion 107 is formed by pressing of steel sheet. Front ends of the bottom portion 114 and the left and right side wall portions 115 are welded to a rear end portion, or an intermediate portion in the lengthwise direction, of the first sub-wheel arm front portion 106. The bottom portion 114 and the left and right side wall portions 115 extend rearwardly from a rear end portion of the first sub-wheel arm front portion 106. The bottom portion 114 extends rearwardly more than the left and right side wall portions 115. A cylindrical columnar support shaft 116 is arranged in a spanning manner between the left and right side wall portions 115. The support shaft 116 is disposed so that its axis extends in the left-right direction.

The second sub-wheel arm 104 includes a second sub-wheel arm front portion 121, and a second sub-wheel arm rear portion 122, that are joined to each other. The second sub-wheel arm front portion 121 is formed by bending a sheet piece. The second sub-wheel arm front portion 121 includes an intermediate portion 124 that has major surfaces facing forward and rearward and extends in the left-right direction, and left and right side portions 125 that extend forward from both left and right ends of the intermediate portion 124 and have major surfaces facing leftward and rightward. Each of the left and right side portions 125 is formed at its front end portion with a through-hole (not shown) penetrating therethrough in the left-right direction. The support shaft 116 is inserted and passed through each of the through-holes. This ensures that the second sub-wheel arm front portion 121 is turnably supported on the support shaft 116. In this way, the first sub-wheel arm rear portion 107 and the second sub-wheel arm front portion 121 constitute the rotary joint portion 102.

A skid plate 120 is detachably attached to a lower surface of the bottom portion 114 of the first sub-wheel arm rear portion 107. The skid plate 120 is a flexible plate-shaped member, and is provided so as to cover the lower surface of the bottom plate 114. The bottom plate 114 is provided with engaging holes 118 penetrating therethrough in the vertical direction. On the other hand, the skid plate 120 is projectingly provided with elastic claws 130 that are detachably locked into the engaging holes 118 in the bottom portion 114.

A lower end portion of the plate-shaped second sub-wheel arm rear portion 122 is fastened to the intermediate portion 124 of the second sub-wheel arm front portion 121 by a bolt 126. The bolt 126 is provided so as to penetrate the intermediate portion 124 of the second sub-wheel arm front portion 121 and to make screw engagement with the second sub-wheel arm rear portion 122. A head portion of the bolt 126 protrudes to the front side of the intermediate portion 124.

A coil portion of a spring 129, that is a helical torsion spring, is supported on the support shaft 116. One end of the spring 129 is in contact with an upper surface of the bottom portion 114 of the first sub-wheel arm rear portion 107. The other end of the spring 129 is hooked on an upper portion of the head portion of the bolt 126, that is integrally connected to the second sub-wheel arm front portion 121 and the second sub-wheel arm rear portion 122. With reference to the inverted pendulum type vehicle 1 as viewed from the left-hand side (see FIG. 8), the second sub-wheel arm front portion 121 is biased clockwise, with the support shaft 116 as a center, in relation to the first sub-wheel arm rear portion 107 by the spring 129. In other words, the second sub-wheel arm front portion 121 supported by the support shaft 116 at its front end portion is biased by the spring 129 in such a manner that its rear end portion is urged downwardly in relation to the support shaft 116. The second sub-wheel arm front portion 121 biased by the spring 129 is maintained in a state wherein the lower edges of the left and right side portions 125 thereof are in contact with the upper surface of the bottom portion 114 of the first sub-wheel arm rear portion 107.

The second sub-wheel arm rear portion 122 has a lower end portion bolted to the intermediate portion 124 of the second sub-wheel arm front portion 121, and extends upwardly in relation to the intermediate portion 124 of the second sub-wheel arm front portion 121. The second sub-wheel arm rear portion 122 is formed in a plate-like shape, of which major surfaces face forward and rearward. The second sub-wheel arm rear portion 122 is formed in a central portion thereof with an insertion hole 131 penetrating therethrough in the front-rear direction.

The sub-wheel unit 6 includes an electric motor 133, a speed reducer 134, and the sub-wheel 5. The electric motor 133 includes a housing (yoke) 137 in which a coil (not shown) is accommodated, and a rotary shaft 138 that is rotatably supported on the housing 137. The housing 137 is joined to a front surface of the second sub-wheel arm rear portion 122 by a bolt or the like, and is disposed on an upper side of the rotary joint portion 102. The rotary shaft 138 of the electric motor 133 passes through the insertion hole 131, and protrudes more to the rear side than the second sub-wheel arm rear portion 122. A rotational angle sensor 139 for detection of the rotational angle of the rotary shaft 138 of the electric motor 133 is mounted to the front end of the housing 137 of the electric motor 133.

The speed reducer 134 has a gear box 141 which constitutes an outer shell. The gear box 141 includes a main body portion 142 formed in the shape of a bottomed cylinder, and a flange portion 143 provided to project outwardly at the opening end of the main body portion 142. The gear box 141 is joined to a rear surface of the second sub-wheel arm rear portion 122 at the flange portion 143 thereof. The interior of the main body portion 142 of the gear box 141 communicates with the insertion hole 131. A gear train (not shown) is accommodated inside the main body portion 142. The gear train includes pluralities of spur gears and planet gears, and is configured so that a predetermined reduction gear ratio is obtained. An output shaft 145 of the speed reducer 134 that is connected to the gear train protrudes rearwardly from the main body portion 142 along the axis of the main body portion 142. A tip end of the output shaft 145 is formed in a flat shape.

The sub-wheel 5 is a so-called omni-wheel that includes one wheel 151, and a plurality of free rollers 153 each rotatably supported on an outer circumferential portion of the wheel 151 through a support shaft 152. The wheel 151 includes a front half 155 and a rear half 156 into which the wheel 151 is bisected on a plane orthogonal to the axis of rotation, and a front plate 157 and a rear plate 158 that hold the front half 155 and the rear half 156 from the direction along the axis of rotation. The front plate 157, the front half 155, the rear half 156, and the rear plate 158 are integrally connected together by a plurality of bolts 161 penetrating them in the front-rear direction and nuts 162 set in screw engagement with the tips of the bolts 161, respectively.

The front half 155 and the rear half 156 are formed in their mating surfaces with grooves 164 and 165 for receiving the free rollers 153. The free roller 153 is rotatably supported by the support shaft 152 inserted and passed through a central portion thereof. Both end portions of the support shaft 152 are held between the front half 155 and the rear half 156. In this manner, the free rollers 153 are each rotatably supported on the wheel 151 through the support shaft 152. The axis of each of the support shafts 152 is disposed at the outer circumferential portion of the wheel 151 in parallel to the tangent to the wheel 151 at each relevant position. In other words, the free rollers 153 are disposed so that their axes of rotation are parallel to the tangents to the wheel 151 at the positions where they are provided respectively.

The front plate 157, the front half 155, and the rear half 156 are formed in their central portions with a receiving hole 168 penetrating therethrough in the front-rear direction. On the other hand, the rear plate 158 is not provided with a through-hole in a central portion thereof but constitutes a bottom portion of the receiving hole 168. The main body portion 142 of the speed reducer 134 is inserted in the receiving hole 168, with a gap therebetween. The output shaft 145 of the speed reducer 134 is press fitted in a connecting hole formed in the center of the rear plate 158. This ensures that the output shaft 145 is connected to the rear plate 158 so that they rotate as one body with each other.

A supporter 171 is joined to the flange portion 143 of the gear box 141, and a sub-wheel cover 172 is supported on the supporter 171 (see FIGS. 1 and 2). The sub-wheel cover 172 is provided so as to cover the upper side, the rear side as well as the left-hand and right-hand sides of the sub-wheel 5.

Figure 8:
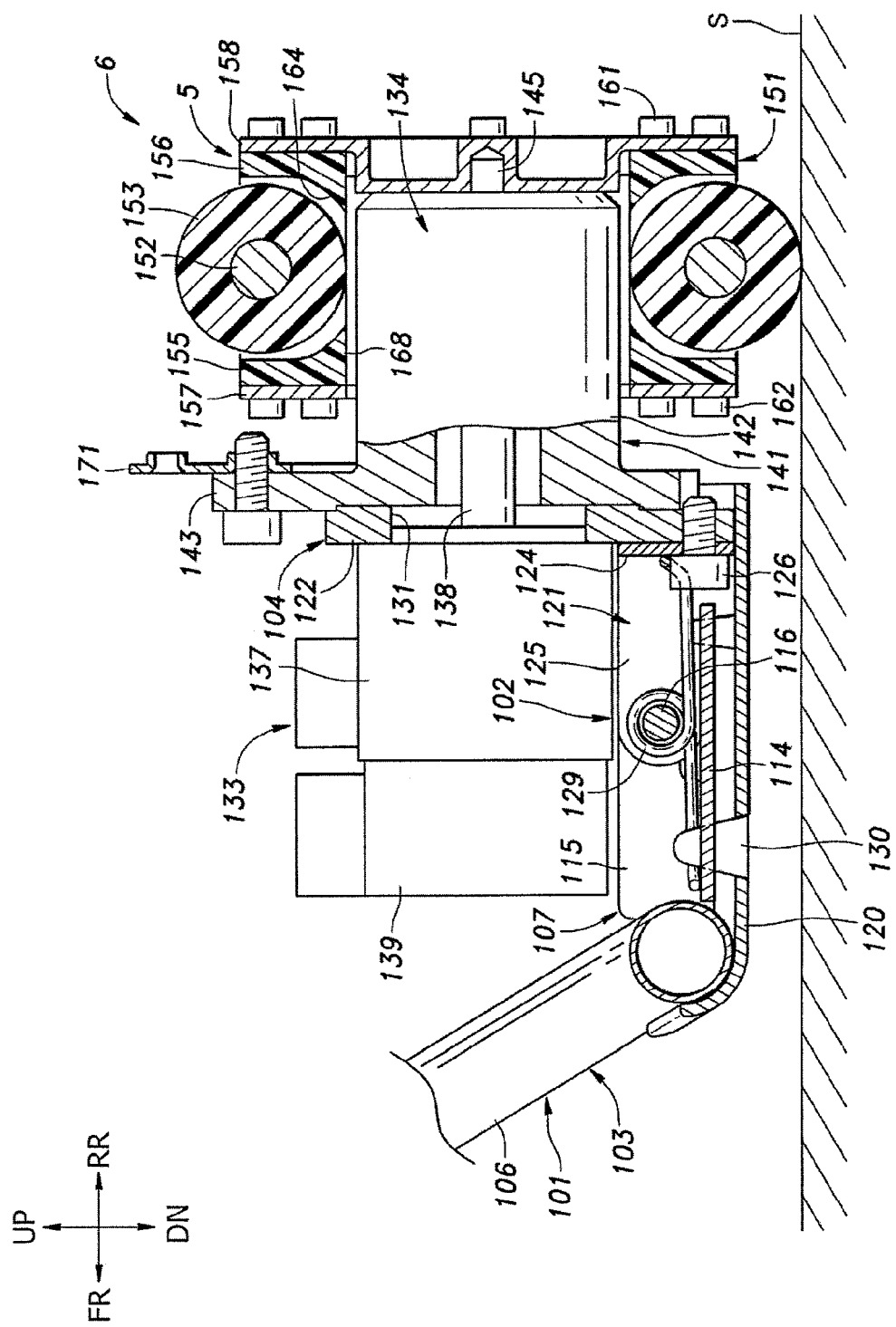
FIG. 8 is a sectional view (showing with the electric motor, the rotational angle sensor and the sub-wheel cover omitted) of the sub-wheel arm and the sub-wheel unit in an initial form.

As shown in FIG. 8, when the first sub-wheel arm 103 is turned relative to the axle 25, the sub-wheel 5 is grounded on the floor surface S at the free roller(s) 153. The same state results also when the vehicle body frame 2 is tilted within a predetermined range. In this instance, the rotary joint portion 102 is biased by the spring 129, and the lower edges of the left and right side portions 125 of the second sub-wheel arm front portion 121 are maintained in contact with the upper surface of the bottom portion 114 of the first sub-wheel arm rear portion 107. In this state, the first sub-wheel arm front portion 106 extends slantly rearward and downward from the axle 25, whereas the bottom portion 114 of the first sub-wheel arm rear portion 107 extends substantially horizontally toward the rear side. In this case, the sub-wheel arm 101 including the first sub-wheel arm 103 and the second sub-wheel arm 104 is disposed separately from the floor surface S. The form of the sub-wheel arm in this instance is referred to as an initial form. In addition, in a state wherein the sub-wheel 5 is grounded, the rotary shaft 138 of the electric motor 133, or the axis of rotation of the wheel 151, extends in the front-rear direction. In other words, the wheel 151 rotates about an axis orthogonal to the axis of the axle 25 (the axis of rotation of the main wheel 3) in plan view.

As shown in FIGS. 1 and 6 and the like, stoppers 175 protruding rearwardly and downwardly are attached to the left and right side posts 21. When the sub-wheel arm 101 is in a predetermined turning position around the axle 25 that extends in the left-right direction, the stopper 175 abuts on an upper surface of the first sub-wheel arm front portion 106. By this abutment, the stopper 175 restricts an upward turning range of the first sub-wheel arm 103 around the axle 25 (the range of counterclockwise turning of the first sub-wheel arm 103 in a state where the vehicle is viewed from the left-hand side (see FIGS. 2 and 3)). In other words, by the abutment of the stopper 175 on the first sub-wheel arm 103, a maximum angle of rearward tilting of the vehicle body frame 2 (the side post 21) is restricted.

A traveling operation of the inverted pendulum type vehicle 1 will now be described. The main wheel PDU calculates, as required, the position of the center of gravity of the inverted pendulum type vehicle 1 as a whole inclusive of the rider seated on the saddle unit 11, from variations in the angles of tilting and angular velocities in the front-rear direction and the left-right direction of the vehicle body frame 2 that are measured by the gyro sensor 91.

When the center of gravity of the inverted pendulum type vehicle 1 as a whole inclusive of the rider is in a neutral position (e.g., on an upper side of the axle 25), the main wheel PDU drives the electric motors 61 of the driving unit 7 on the basis of a control process according to an inverted pendulum control rule, thereby maintaining the vehicle body frame 2 in an upright posture.

In this instance, the sub-wheel PDU maintains the electric motor 133 of the sub-wheel unit 6 in a halt state on the basis of a control process according to a turning (turning-round) control rule, so that the sub-wheel 5 is not put into rotation.

When the center of gravity of the inverted pendulum type vehicle 1 as a whole inclusive of the rider is moved to the front side relative to the neutral position, the main wheel PDU drives the electric motors 61 of the driving unit 7 at the same speed in the respective normal directions, based on the control process according to the inverted pendulum control rule. By the driving of the electric motors 61, the left and right driving disks 50 are rotated forward at the same speed. As a result, the main wheel 3 is rotated normally, with its own wheel center as an axis of rotation, or it is revolved in a forward-traveling direction. In this case, no difference in rotational speed is generated between the left and right driving disks 50. Therefore, none of the driving rollers 58 of the driving disks 50 and the driven rollers 54 of the main wheel 3 is put into rotation on its own axis, so that the inverted pendulum type vehicle 1 travels straight forward.

When the center of gravity of the inverted pendulum type vehicle 1 as a whole inclusive of the rider is moved to the rear side relative to the neutral position, the main wheel PDU drives the electric motors 61 of the left and right driving unit 7 at the same speed in the reverse direction, under the control process according to the inverted pendulum control rule. By the driving of the electric motors 61, the left and right driving disks 50 are reversely rotated at the same speed. This ensures that the main wheel 3 is rotated reversely, with its own wheel center as an axis of rotation, or it is revolved in a rearward-traveling direction. In this instance, no difference in rotational speed is generated between the left and right driving disks 50. Accordingly, none of the driving rollers 58 of the driving disks 50 and the driven rollers 54 of the main wheel 3 is put into rotation on its own axis, so that the inverted pendulum type vehicle 1 travels straight rearward.

At the time of forward traveling and at the time of rearward traveling, the sub-wheel PDU maintains the electric motor 133 of the sub-wheel unit 6 in a halt state, under the control process according to the turning (turning-round) control rule, so that the sub-wheel 5 is not put into revolution. In this case, the free rollers 153 of the sub-wheel 5 are put into rotation on their own axes as the inverted pendulum type vehicle 1 travels forward.

When the center of gravity of the inverted pendulum type vehicle 1 as a whole inclusive of the rider is moved to the left-hand side or the right-hand side relative to the neutral position, the main wheel PDU drives the electric motors 61 of the driving unit 7 in different rotating directions and/or at different rotational speeds, under the control process according to the inverted pendulum control rule. By the driving of the electric motors 61, a difference in rotational speed is generated between the left and right driving disks 50. As a result, in addition to a force in the circumferential (tangential) direction due to rotational forces of the left and right driving disks 50, a component of force orthogonal to this force is exerted on each of contact surfaces between the driving rollers 58 of the left and right driving disks 50 and the driven rollers 54 of the main wheel 3. This component of force causes each of the driven rollers 54 to rotate on its own center axis (rotate on its own axis).

The rotation of the driven rollers 54 is determined by the difference in rotational speed between the left and right driving disks 50. For instance, when the left and right driving disks 50 are rotated at the same speed in opposite directions, revolution of the main wheel 3 does not occur, and only rotation of the driven rollers 54 on their own axes occurs. This ensures that a traveling force in the left-right direction is exerted on the main wheel 3. As a result, the inverted pendulum type vehicle 1 moves in the left-right direction (straight transverse movement). In addition, when the left and right driving disks 50 are rotated in the same direction but at different speeds, rotation of the driven rollers 54 on their own axes as well as revolution of the main wheel 3 occur. Consequently, the inverted pendulum type vehicle 1 moves obliquely forward or obliquely rearward.

In this instance, the sub-wheel PDU may drive the electric motor 133 of the sub-wheel unit 6 to put the sub-wheel 5 into rotation (revolution) in a rotational speed comparable to the straight transverse moving speed, under the control process according to the turning (turning-round) control rule. In the case where there occurs a difference between the moving amount due to the rotation of the driven rollers 54 of the main wheel 3 and the moving amount due to the rotation of the sub-wheel 5, the inverted pendulum type vehicle 1 turns (turns round).

Figure 9:
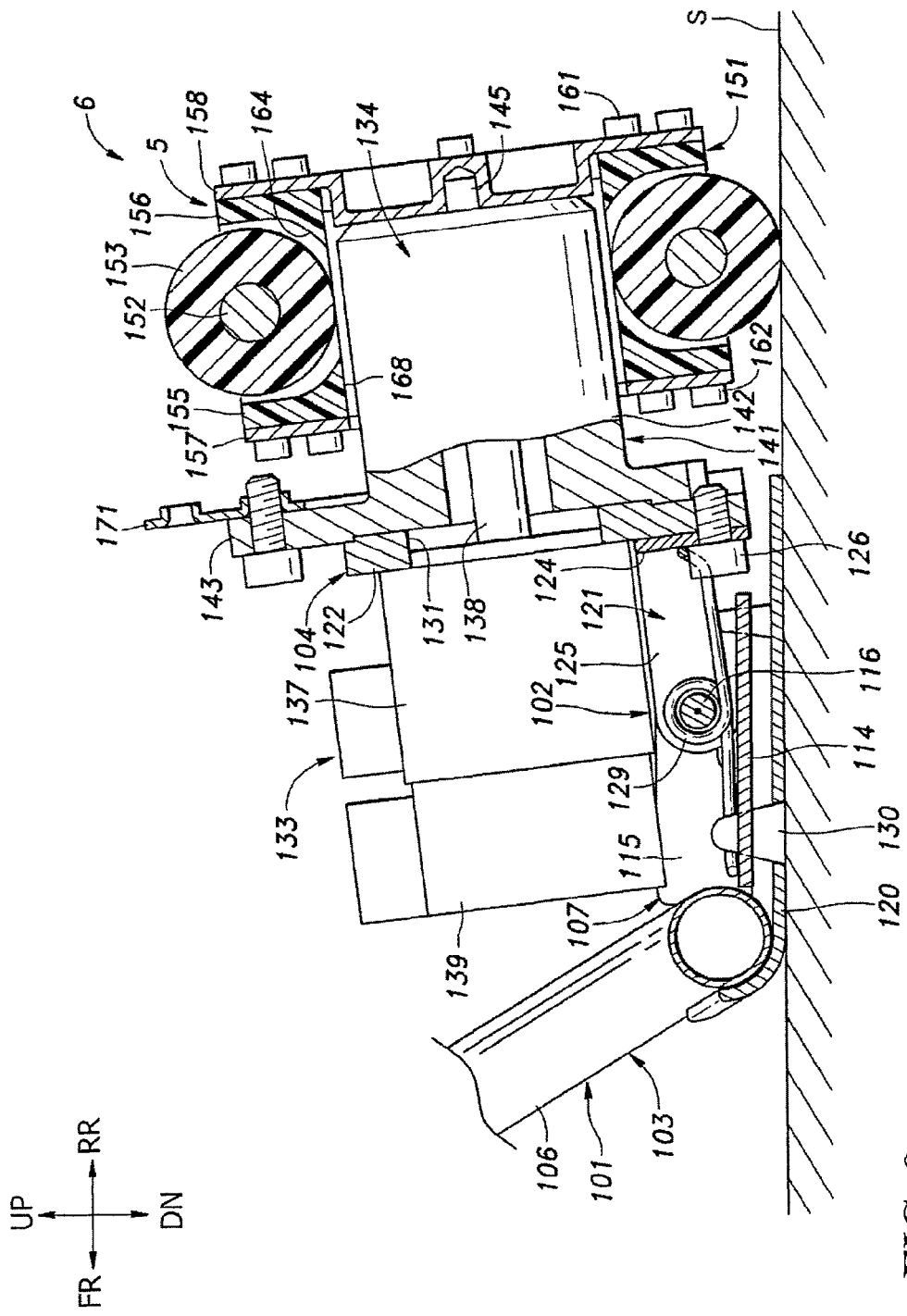
FIG. 9 is a sectional view (showing with the electric motor, the rotational angle sensor and the sub-wheel cover omitted) of the sub-wheel arm and the sub-wheel unit in a bent form.

When the inverted pendulum control is being performed, forward tilting and rearward tilting of the vehicle body frame 2 with the axle 25 as a center of tilting are kept within predetermined ranges. Therefore, the first sub-wheel arm 103 would not make contact with the stopper 175. On the other hand, when the inverted pendulum control is not being performed (e.g., at the halt time), the vehicle body frame 2 can freely be turned around the axle 25 which extends in the left-right direction. Therefore, the vehicle body frame 2 can be tilted rearward in excess of a predetermined range. When the vehicle body frame 2 is tilted rearward, the stopper 175 makes contact with the first sub-wheel arm 103, and presses the first sub-wheel arm 103 downwardly. This causes the rotary joint portion 102 to bend with the support shaft 116 (which extends in the left-right direction) as a center, against the biasing force of the spring 129 (the second sub-wheel arm 104 turns around the support shaft 116 extending in the left-right direction, relative to the first sub-wheel arm 103). FIG. 9 is a sectional view (showing with the electric motor, the rotational angle sensor and the sub-wheel cover omitted) of the sub-wheel arm and the sub-wheel unit in the bent form. As shown in FIG. 9, when the rearward tilting of the vehicle body frame 2 proceeds, the bottom portion 114 of the first sub-wheel arm rear portion 107 abuts on the floor surface S, with the skid plate 120 therebetween. The form of the sub-wheel arm 101 in the bent state in this instance is referred to as the bent form. In this state, the rearward tilting of the vehicle body frame 2 is restricted. In other words, the vehicle body frame 2 is maintained at a predetermined angle relative to the floor surface S, with the first sub-wheel arm 103 as a support.

As above-described, when the vehicle body frame 2 is tilted rearward, the sub-wheel arm 101 bends at the rotary joint portion 102, and the bottom portion 114 of the first sub-wheel arm rear portion 107 abuts on the floor surface S. Therefore, exertion of the load of the vehicle body frame 2 on the sub-wheel unit 6 can be avoided. More specifically, exertion of the load on the output shaft 145 of the speed reducer 134, the rotary shaft 138 of the electric motor 133, the joint portions between the second sub-wheel arm rear portion 122 and the housing 137 of the electric motor 133 as well as the gear box 141, and the joint portion between the output shaft 145 of the speed reducer 134 and the rear plate 158 of the sub-wheel 5, can be obviated. Consequently, the load resistance required of the sub-wheel unit 6 can be minimized.

The rotary joint portion 102 of the sub-wheel arm 101 is disposed below the line segment interconnecting the front end portion of the sub-wheel arm 101 that is supported by the axle 25 and the rear end portion of the sub-wheel arm 101 that supports the electric motor 133. Therefore, the rotary joint portion 102 can turn smoothly when the first sub-wheel arm 103 is pressed downwardly by the stopper 175 of the vehicle body frame 2. In addition, when an obstacle on a road surface collides against the sub-wheel 5 during traveling of the inverted pendulum type vehicle 1, the sub-wheel arm 101 and the rotary joint portion 102 are turned, so that the sub-wheel 5 can smoothly come over the obstacle.

In addition, as shown in FIG. 2, that rearmost end portion R of the sub-wheel unit 6 that is most remote from the main wheel 3 rearwardly in the horizontal direction is composed of the sub-wheel cover 172. Now, a horizontal line passing through the rearmost end portion R is assumed to be a horizontal line H, and a line segment interconnecting the rearmost end portion R and the center of the turning shaft 111 is assumed to be a line segment L1. Then, the rotary joint portion 102 is disposed below the horizontal line H and the line segment L1. Therefore, when the inverted pendulum type vehicle 1 moves to the rear and an obstacle on the floor surface S collides against the rearmost end portion R of the sub-wheel unit 6 from the rear side of the sub-wheel unit 6, the sub-wheel unit 6 side can smoothly turn upwardly, with the rotary joint portion 102 as a center of turning. This contributes to an absorption of the impact.

When the vehicle body frame 2 turns from the rearwardly tilted state to the front side with the axle 25 as a center of turning, the rotary joint portion 102 of the sub-wheel arm 101 is biased by the spring 129. In this instance, the left and right side portions 125 of the second sub-wheel arm front portion 121 are turned until they come into contact with the bottom portion 114 of the first sub-wheel arm rear portion 107. As a result, the bottom portion 114 of the first sub-wheel arm rear portion 107 parts from the floor surface S. Thus, the initial form is regained.

Figure 10:
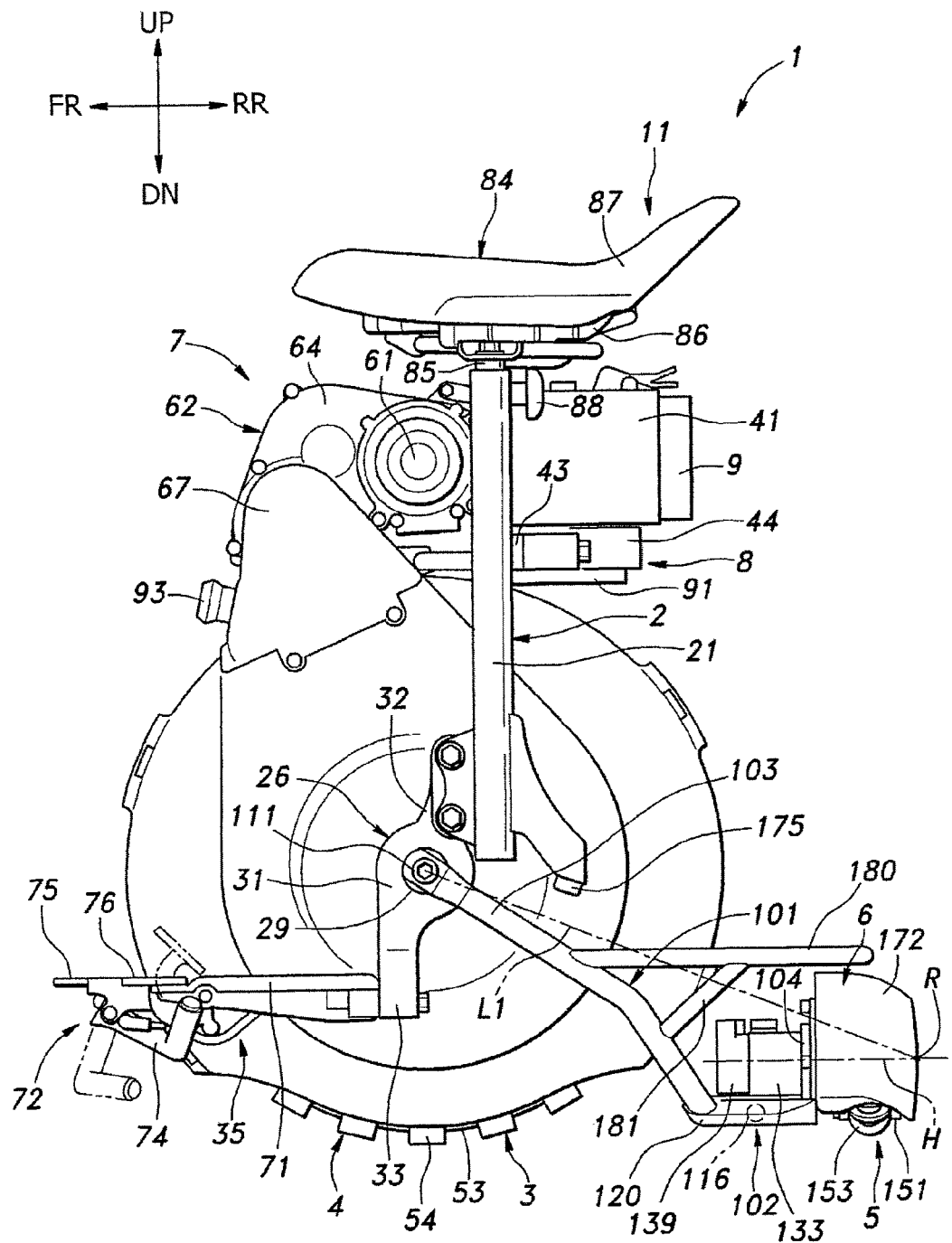
FIG. 10 is a side view of an inverted pendulum type vehicle, showing a modification of a first sub-wheel arm.

Now, referring to FIG. 10, an example in which the first sub-wheel arm 103 is provided with a guard 180 for protecting the sub-wheel unit 6 will be described, as a modification of the first sub-wheel arm 103. FIG. 10 is a side view of the inverted pendulum type vehicle 1, showing a modification of the first sub-wheel arm 103. As shown in FIG. 10, the guard 180 is a member protruding substantially horizontally toward the rear side from the first sub-wheel arm front portion 106. The guard 180 is formed from a pipe material, for example. The guard 180 is U-shaped in a plan view, and has a bifurcated front end. At the front ends of the bifurcated front end portion, the guard 180 is joined to left and right portions of the bifurcated portion of the first sub-wheel arm front portion 106 by welding or the like. This ensures that the main wheel unit 4 and the wheel cover 67 are disposed between the front ends of the bifurcated front end portion of the guard 180, and a rear portion of the guard 180 is disposed rearwardly of the main wheel unit 4.

The rear portion of the guard 180 extends so as to cover the upper side of the sub-wheel unit 6. A slant member 181 is spanningly arranged between a front portion of the guard 180 and the first sub-wheel arm front portion 106. This reinforces a joint portion between the front portion of the guard 180 and the first sub-wheel arm front portion 106. The position in the front-rear direction of a rearmost end of the guard 180 relative to the sub-wheel unit 6 is not particularly limited, but, preferably, the rearmost end is disposed forwardly of the rearmost end portion R of the sub-wheel unit 6. The guard 180 is disposed at such a position so as not to make contact with the sub-wheel unit 6 when the rotary joint portion 102 bends.

With the upper side of the sub-wheel unit 6 covered by the guard 180, exertion of a load on the sub-wheel unit 6 from above the sub-wheel unit 6 can be restrained. For instance, when a person's foot or the like approaches the sub-wheel unit 6 from above, the foot is blocked by the guard 180, so that the sub-wheel unit 6 can be prevented from being stepped on directly by the foot. The load of the foot is exerted on the first sub-wheel arm 103 via the guard 180 and the slant member 181. This causes the rotary joint portion 102 to bend, resulting in that the first sub-wheel arm 103 is grounded on the floor.

Where the guard 180 is provided, the supporter 171 may be omitted, and the sub-wheel cover 172 may be supported by the guard 180. In this case, the sub-wheel 5 moves relative to the sub-wheel cover 172 when the rotary joint portion 102 bends.

Figure 11:
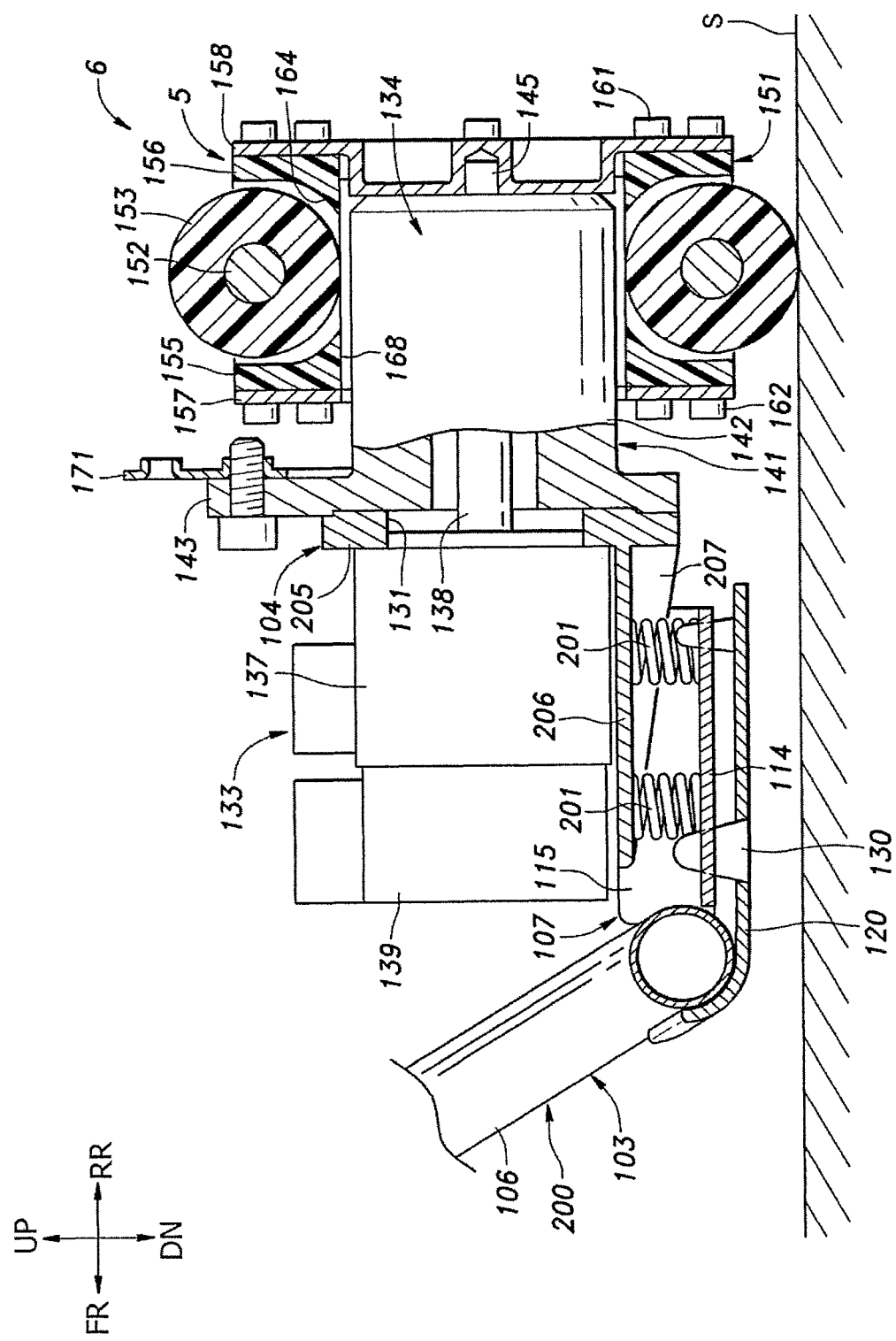
FIG. 11 is a sectional view (showing with the electric motor, the rotational angle sensor and the sub-wheel cover omitted) of a sub-wheel arm and a sub-wheel unit in an initial form in a partly modified embodiment.
Figure 12:
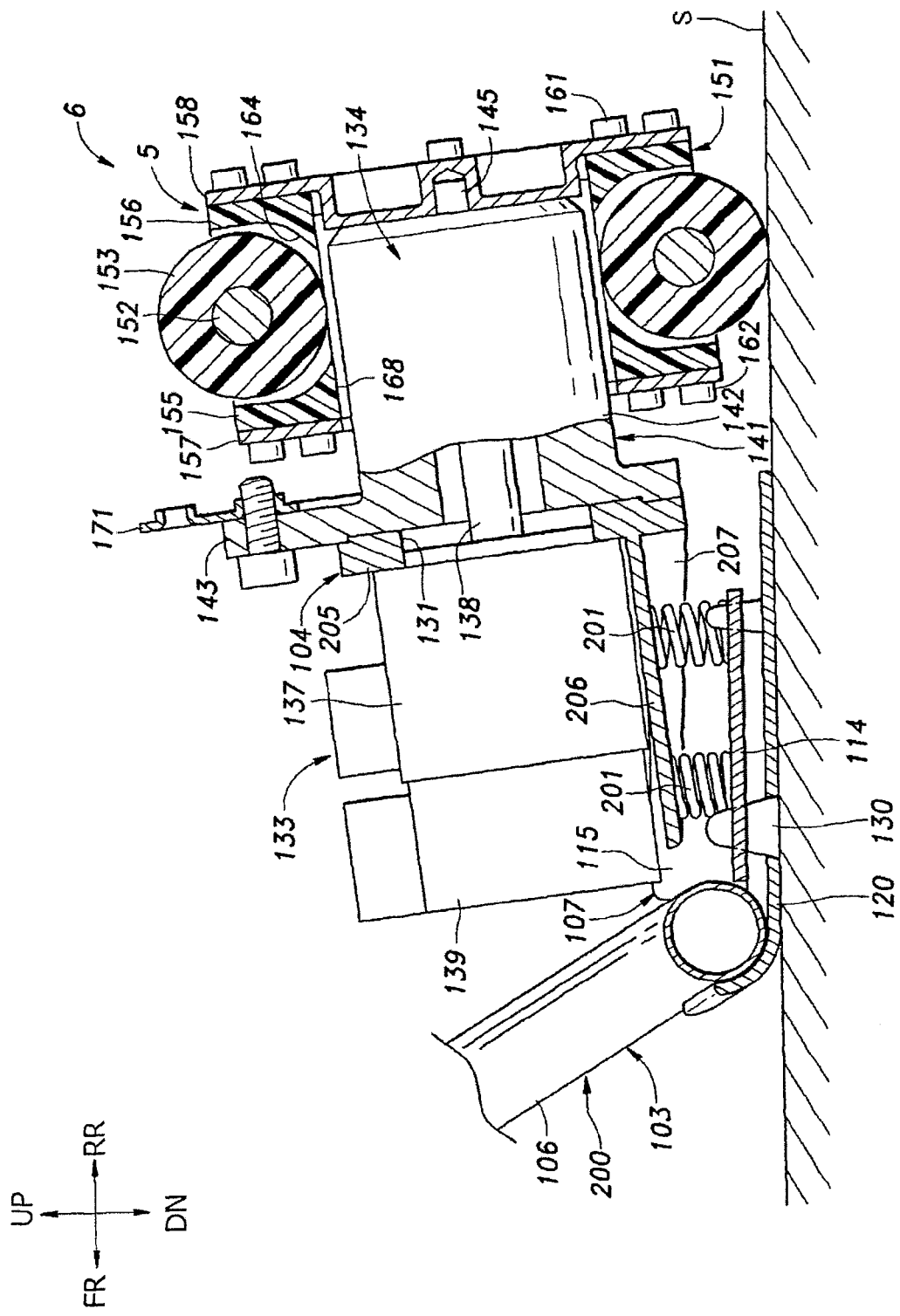
FIG. 12 is a sectional view (showing with the electric motor, the rotational angle sensor and the sub-wheel cover omitted) of the sub-wheel arm and the sub-wheel unit in a deformed form in the partly modified embodiment.

Now, a partly modified embodiment obtained by partly modifying the above-described embodiment will be described referring to FIGS. 11 and 12. FIG. 11 is a sectional view (showing with the electric motor, the rotational angle sensor and the sub-wheel cover omitted) of a sub-wheel arm and a sub-wheel unit in an initial form in the partly modified embodiment. FIG. 12 is a sectional view (showing with the electric motor, the rotational angle sensor and the sub-wheel cover omitted) of the sub-wheel arm and the sub-wheel unit in a deformed form in the partly modified embodiment. As shown in FIG. 11, a sub-wheel arm 200 according to the partly modified embodiment does not have the rotary joint portion 102. In addition, the first sub-wheel arm 103 and the second sub-wheel arm 104 are connected to each other through a plurality of springs 201 (biasing devices). Of the configuration of the sub-wheel arm 200 according to the partly modified embodiment, the same components as those in the above embodiment are denoted by the same symbols as used above, and descriptions of them are omitted.

The second sub-wheel arm 104 does not have the second sub-wheel arm front portion 121, but has a vertical wall portion 205 corresponding to the second sub-wheel arm rear portion 122. The vertical wall portion 205 is formed in a plate-like shape having major surfaces facing forward and rearward, like the second sub-wheel arm rear portion 122. The vertical wall portion 205 is formed in a central portion thereof with the insertion hole 131 penetrating therethrough in the front-rear direction. The housing 137 of the electric motor 133 and the flange portion 143 of the gear box 141 are joined to the vertical wall portion 205. At a lower portion of the vertical wall portion 205, a lower plate portion 206 extending forward under the electric motor 133 and the rotational angle sensor 139 is projectingly provided. The lower plate portion 206 is disposed so that its major surfaces face upward and downward. The lower plate portion 206 is restrained from tilting relative to the vertical wall portion 205, by a reinforcing wall portion 207 arranged spanningly between the vertical wall portion 205 and the lower plate portion 206.

The lower plate portion 206 is disposed so as to face the bottom portion 114 of the first sub-wheel arm 103. The plurality of springs 201, which are coil springs, are interposed between the lower plate portion 206 and the bottom portion 114. Of each of the springs 201, one end is joined to a lower surface of the lower plate portion 206, while the other end is joined to an upper surface of the bottom portion 114. In this configuration, the first sub-wheel arm 103 and the second sub-wheel arm 104 are joined to each other through the springs 201.

As shown in FIG. 11, when the first sub-wheel arm 103 is not pressed by the stopper 175, the sub-wheel arm 200 including the first sub-wheel arm 103 and the second sub-wheel arm 104 are separate from the floor surface S, and the sub-wheel 5 is grounded on the floor surface S due to its own weight. As shown in FIG. 12, when the vehicle body frame 2 tilts rearwardly and the stopper 175 presses the first sub-wheel arm 103 downwardly, the springs 201 are deformed, and the first sub-wheel arm 103 abuts on the floor surface S, with the skid plate 120 therebetween. Therefore, exertion of the load of the vehicle body frame 2 on the sub-wheel unit 6 can be avoided, like in the above-described embodiment. Thus, even where the rotary joint portion 102 is not provided, a configuration wherein the load from the vehicle body frame 2 is not exerted on the sub-wheel unit 6 can be realized by supporting the sub-wheel unit 6 on the first sub-wheel arm 103 via the deformable springs 201 and the second sub-wheel arm 104.

In the partly modified embodiment as described above, the second sub-wheel arm 104 is provided with the lower plate portion 206, and one end of each of the springs 201 is joined to the lower plate portion 206. In a further embodiment, however, the lower plate portion 206 may be omitted, and one end of each of the springs 201 may be joined directly to a component of the sub-wheel unit 6, such as the housing 137 of the electric motor 133, the gear box 141, etc. In that case, the second sub-wheel arm 104 inclusive of the vertical wall portion 205 may be omitted, and the housing 137 of the electric motor 133 and the gear box 141 may be joined directly to each other.

While some embodiments of the present invention have been described above, the invention can be modified, as required, within the scope of the gist thereof. While a configuration wherein the sub-wheel 5 is disposed rearwardly of the main wheel 3 has been described in the above embodiments, the position of the sub-wheel is not restricted to be rearwardly of the main wheel 3. The sub-wheel may be disposed on the left-hand or right-hand side or the front side of the main wheel 3, to be a side wheel or a front wheel. In other words, it suffices for the sub-wheel to be able to generate a frictional force between itself and the floor surface S at a position spaced from the main wheel 3, at the time of turning (turning-round) of the inverted pendulum type vehicle 1. Therefore, the position of the sub-wheel relative to the main wheel 3 is not particularly restricted. In addition, it is preferable that the sub-wheel permits a reduction in the frictional force between itself and the floor surface S so that it does not resist the traveling of the inverted pendulum type vehicle 1 when the inverted pendulum type vehicle 1 does not perform turning (turning-round). Therefore, it is preferable for the sub-wheel to include free rollers 153, like the sub-wheel 5 in the above embodiments.

In the above embodiments, the state wherein the bottom portion 114 of the first sub-wheel arm rear portion 107 and the left and right side portions 125 of the second sub-wheel arm front portion 121 are kept in contact with each other by the biasing force of the spring 129 is the initial form of the rotary joint portion 102. In a further embodiment, however, by use of a helical extension spring, the rotary joint portion 102 may be maintained in a state wherein the first sub-wheel arm 103 and the second sub-wheel arm 104 are not in contact with each other, and this state may be made to be the initial form. For example, a configuration may be adopted in which the first sub-wheel arm 103 and the second sub-wheel arm 104 are provided with portions facing each other in the left-right direction and in which helical extension springs extending in the left-right direction are spanningly arranged between the mutually facing portions. Such a configuration permits the rotary joint portion 102 to rotate in any rotating direction, with the support shaft 116 as a center, from the initial form.

In addition, while a configuration wherein the sub-wheel arm 101 is provided with one rotary joint portion 102 has been adopted in the above embodiments, a plurality of rotary joint portions 102 may be provided in a further embodiment.

In addition, in a partly modified embodiment, an elastomer such as a rubber, or a leaf spring, having appropriate spring characteristics may be applied in place of the spring 201 which is a helical spring.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inverted pendulum vehicle including a main wheel adapted to move forward, rearward, in a left direction and in a right direction and a vehicle body frame supported by the main wheel, the inverted pendulum vehicle comprising:
    a sub-wheel arm vertically turnably supported on the vehicle body frame; and
    a sub-wheel supported by the sub-wheel arm and grounded;
    wherein the sub-wheel is supported through a deformable biasing device, the sub-wheel being biased into a predetermined position in relation to the sub-wheel arm;
    the biasing device deforms to ground at least part of the sub-wheel arm when a downward load is exerted on the sub-wheel arm;
    the sub-wheel arm includes a first sub-wheel arm supported on the vehicle body frame so as to be turnable about an axis substantially parallel to an axis of rotation of the main wheel and a second sub-wheel arm supported on the first sub-wheel arm so as to be turnable about an axis substantially parallel to the axis of rotation of the main wheel within a predetermined turning range;
    the biasing device is a spring provided between the first sub-wheel arm and the second sub-wheel arm, the spring biasing an end portion of the second sub-wheel arm on a sub-wheel side toward a floor surface side in relation to an end portion of the second sub-wheel arm on the first sub-wheel arm side; and
    the sub-wheel arm includes a bendable rotary joint portion that bendably connects the first and second sub-wheel arms to each other, and the biasing device biases the rotary joint portion into a predetermined angle.

2. The inverted pendulum vehicle according to claim 1, wherein an endmost portion (R) of the sub-wheel which is horizontally spaced most from the main wheel is disposed above the rotary joint portion in a vertical direction.

3. The inverted pendulum vehicle according to claim 2, wherein the rotary joint portion is located below a line segment (L1) interconnecting a turning shaft for turning of the sub-wheel arm in relation to the vehicle body frame and the endmost portion.

4. The inverted pendulum vehicle according to claim 1, wherein the sub-wheel includes a wheel rotatably supported on the sub-wheel arm and a plurality of free rollers supported on an outer circumferential portion of the wheel so as to be each rotatable about a tangent to the wheel; and the wheel is driven by an electric motor.

5. The inverted pendulum vehicle according to claim 2, wherein the sub-wheel includes a wheel rotatably supported on the sub-wheel arm and a plurality of free rollers supported on an outer circumferential portion of the wheel so as to be each rotatable about a tangent to the wheel; and the wheel is driven by an electric motor.

6. The inverted pendulum vehicle according to claim 3, wherein the sub-wheel includes a wheel rotatably supported on the sub-wheel arm and a plurality of free rollers supported on an outer circumferential portion of the wheel so as to be each rotatable about a tangent to the wheel; and the wheel is driven by an electric motor.

7. An inverted pendulum vehicle including a main wheel adapted to move forward, rearward, in a left direction and in a right direction and a vehicle body frame supported by the main wheel, the inverted pendulum vehicle comprising:
    a sub-wheel arm vertically turnably supported on the vehicle body frame; and
    a sub-wheel supported by the sub-wheel arm and grounded;
    wherein the sub-wheel is supported through a deformable biasing device, the sub-wheel being biased into a predetermined position in relation to the sub-wheel arm;
    the biasing device deforms to ground at least part of the sub-wheel arm when a downward load is exerted on the sub-wheel arm; and
    the sub-wheel arm has an attachable and detachable skid plate at a portion thereof that is grounded when the vehicle body frame is tilted toward the sub-wheel side.

8. The inverted pendulum vehicle according to claim 7, wherein the sub-wheel arm has at least one bendable rotary joint portion, and the biasing device biases the rotary joint portion in a vertical direction.

9. The inverted pendulum vehicle according to claim 8, wherein an endmost portion (R) of the sub-wheel arm which is horizontally spaced most from the main wheel is disposed above the rotary joint portion in a vertical direction.

10. An inverted pendulum vehicle including a main wheel adapted to move forward, rearward, in a left direction and in a right direction and a vehicle body frame supported by the main wheel, the inverted pendulum vehicle comprising:
    a sub-wheel arm vertically turnably supported on the vehicle body frame; and
    a sub-wheel supported by the sub-wheel arm and grounded;
    wherein the sub-wheel is supported through a deformable biasing device, the sub-wheel being biased into a predetermined position in relation to the sub-wheel arm;
    the biasing device deforms to ground at least part of the sub-wheel arm when a downward load is exerted on the sub-wheel arm;
    the sub-wheel arm includes at least one bendable rotary joint portion, and the biasing device biases the rotary joint portion into a predetermined angle;
    an endmost portion (R) of the sub-wheel which is horizontally spaced most from the main wheel is disposed above the rotary joint portion in a vertical direction; and
    the rotary joint portion is located below a line segment (L1) interconnecting a turning shaft for turning of the sub-wheel arm in relation to the vehicle body frame and the endmost portion.

* * * * *